United States Patent
Rowland et al.

(10) Patent No.: US 8,973,141 B2
(45) Date of Patent: Mar. 3, 2015

(54) UNIVERSAL ACTOR CORRELATOR

(71) Applicant: Click Security, Inc., Austin, TX (US)

(72) Inventors: Victoria L. Rowland, Bonners Ferry, ID (US); Brian Smith, Fort Worth, TX (US)

(73) Assignee: Click Security, Inc., Austin, TX (US)

( * ) Notice: Subject to any disclaimer, the term of this patent is extended or adjusted under 35 U.S.C. 154(b) by 21 days.

(21) Appl. No.: 13/843,414

(22) Filed: Mar. 15, 2013

(65) Prior Publication Data

US 2014/0282871 A1    Sep. 18, 2014

(51) Int. Cl.
*H04L 29/06*    (2006.01)
*G06F 12/14*    (2006.01)
*G06F 21/60*    (2013.01)

(52) U.S. Cl.
CPC ............. *H04L 63/20* (2013.01); *H04L 63/08* (2013.01); *H04L 63/10* (2013.01); *G06F 21/60* (2013.01)

USPC .............. 726/23; 726/3; 726/25; 726/27

(58) Field of Classification Search
None
See application file for complete search history.

(56) References Cited

U.S. PATENT DOCUMENTS

2010/0235879 A1*  9/2010  Burnside et al. .......... 726/1
2013/0298242 A1*  11/2013  Kumar et al. .......... 726/25

* cited by examiner

*Primary Examiner* — Fatoumata Traore
(74) *Attorney, Agent, or Firm* — Terrile, Cannatti, Chambers & Holland, LLP; Robert W. Holland

(57) ABSTRACT

Precorrelation of data applied to use cases by a module intermediate to the data and use cases provides normalized data across multiple sources for more effective analysis. For example, network sensors provide network telemetry to a precorrelation core, which extracts and normalizes the data to correlate actors to events. Universal actor correlation improves visualizations by creating a mesh of events tied to each other through a common actor.

3 Claims, 24 Drawing Sheets

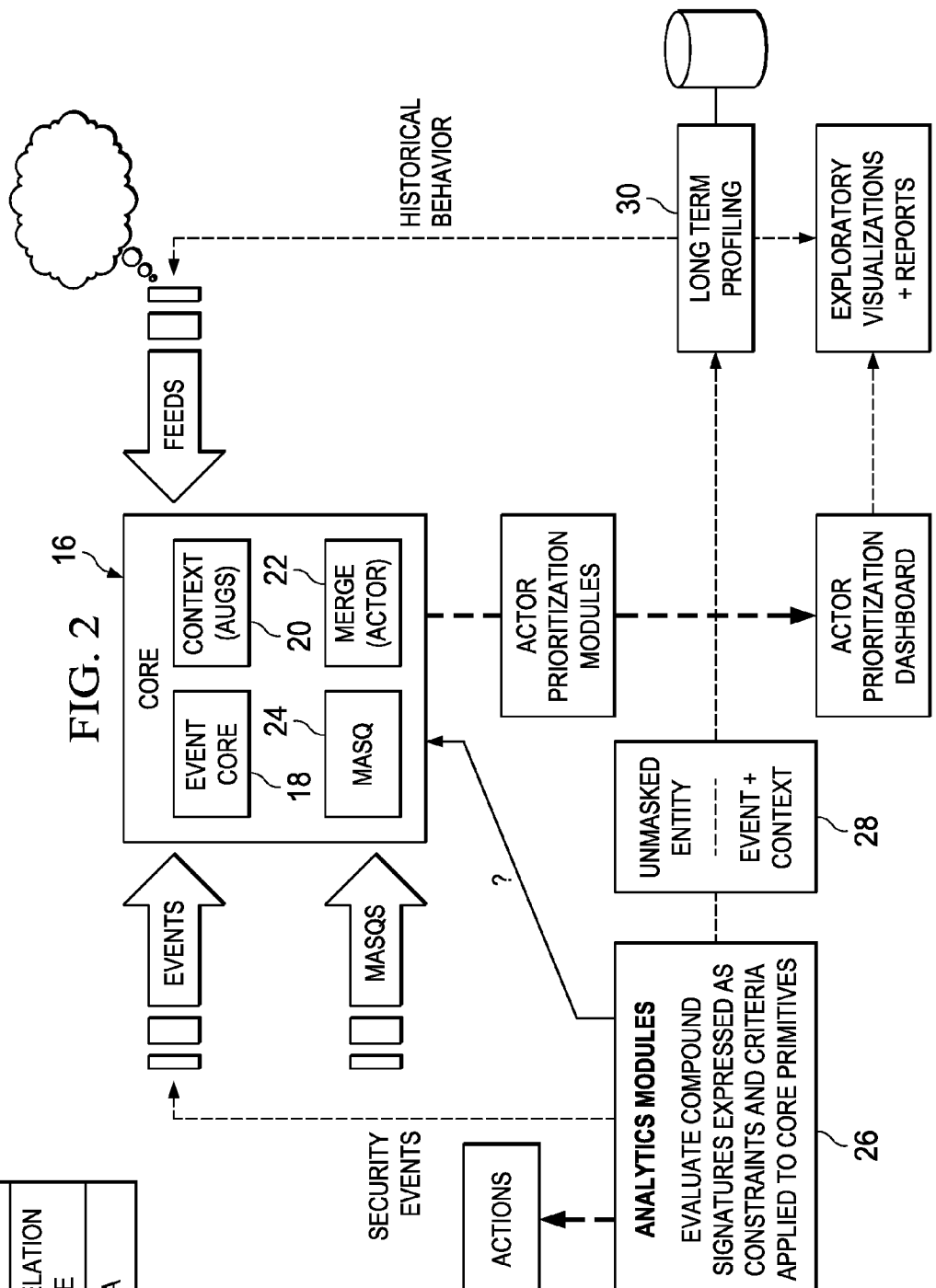

FIG. 6C

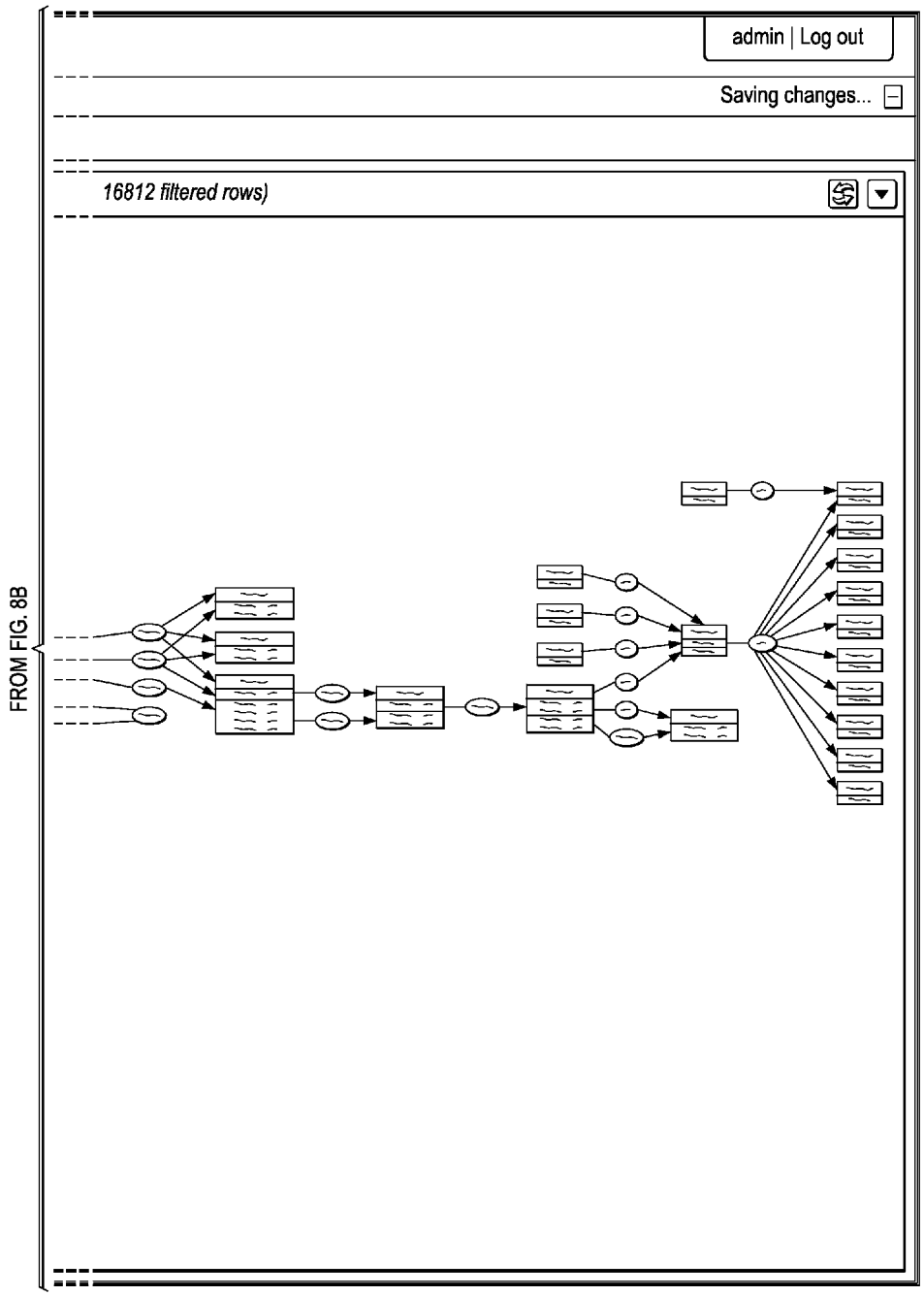

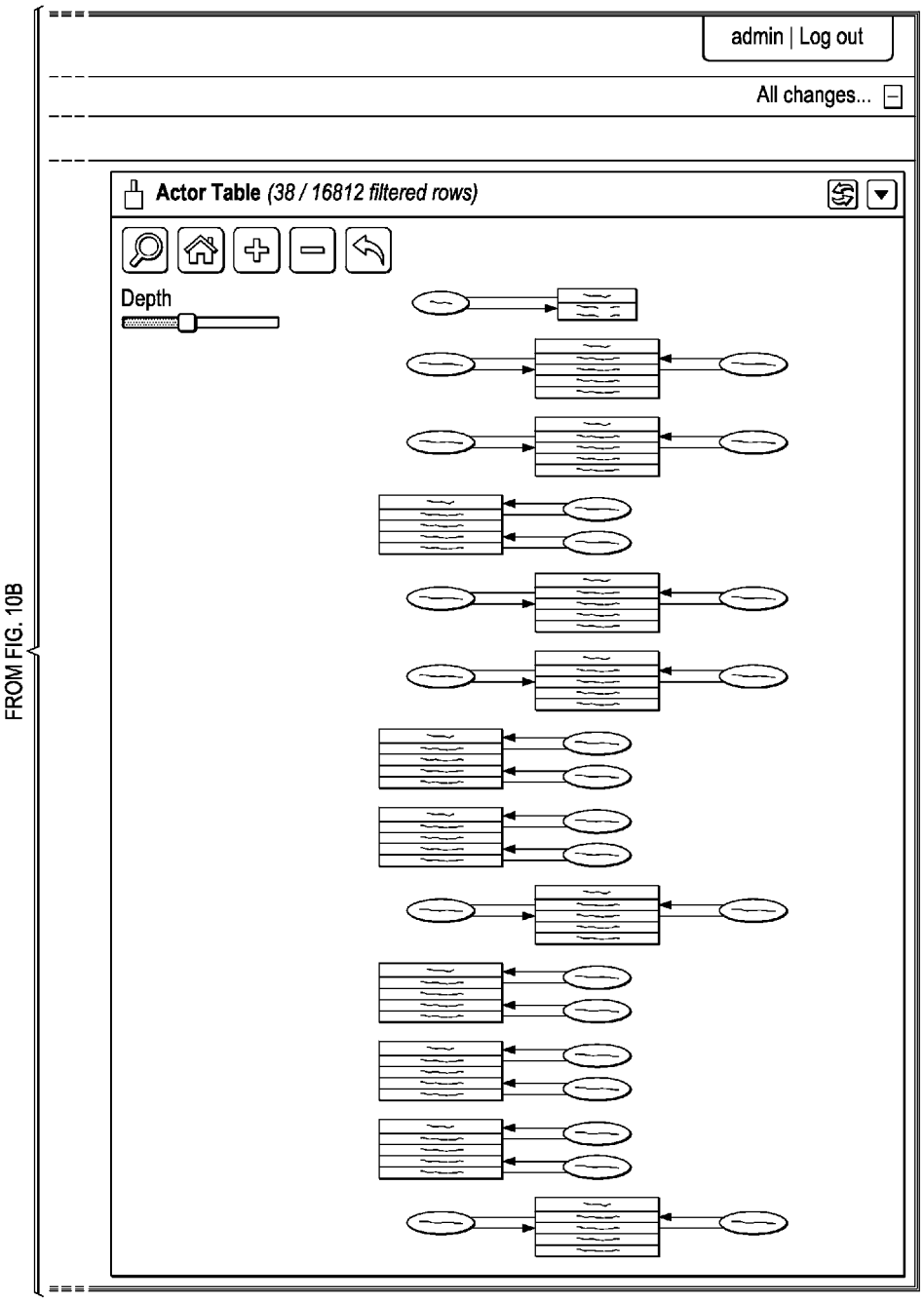

UNIVERSAL ACTOR CORRELATOR

BACKGROUND OF THE INVENTION

1. Field of the Invention

The present invention relates in general to the field of analyzing data, and more particularly to a universal actor correlator to precorrelate data for analysis and visualization.

2. Description of the Related Art

Enterprises collect and use data for a wide variety of purposes. Large stores of data do little good, however, unless the data is analyzed to find relevant relationships. Even if relevant relationships are found, presentation of the relationships and their impact tend to cause confusion unless some explanation of the relevance is provided. Examples of large data stores include weather sensor data, oil field surveys, and network security monitoring. One option for analysis of large data stores is perform a massive data crunch with supercomputers, however, this is expensive and often produces stale results by the time the numbers are crunched.

In the field of network security in particular, timely data analysis presents a challenge since delayed analysis tends to fail to identify threats rapidly enough to react before damage is done. Network security attackers are often organized into factions that have common political or financial goals. Attack tools are often well-developed with significant man-hours in their creation, testing and refinement. Attacks against high-value vertical targets, such as financials, power grids, military defense, etc. . . . , are generally thoroughly planned and tested. Failure to rapidly detect and respond to an attack can result in costly losses.

Generally, network security attacks are monitored and detected with specific use cases applied to individual data sources. This generally requires an intimate relationship between each specific use case and the individual data sources. For instance, each use case typically includes a specialized correlation to be written that accounts for quirks in the data. A "store now, analyze later" approach adds processing burdens for time correlations when searching for relationships, resulting in a slow and laborious analysis in which only a handful of correlations can run simultaneously, the analysis does not scale and visualizations of relationships are difficult. Applying use cases to individual data sources tends to provide a narrow perspective that is not well suited for discovery of leads and relate activity with visualizations that have a flat view showing a cascade of events. Analysis of use case output tends to be a manual, iterative and time-consuming process that depends upon individual analyst experience to flag network security attacks.

SUMMARY OF THE INVENTION

Therefore a need has arisen for a system and method which provides a universal actor correlator to precorrelate data for analysis by use cases.

In accordance with the present invention, a system and method are provided which substantially reduce the disadvantages and problems associated with previous methods and systems for performing data analysis with use cases. A universal actor correlator precorrelates data for analysis by use cases. Small, lightweight and fast use case modules operate on pre-correlated data to provide automated fan out visualizations that relate actors to events as a visualization anchor.

The present invention provides a number of important technical advantages. One example of an important technical advantage is that fanout visualizations relate actors to events to provide improved analysis that show relationships by actor. Precorrelation provides a tool that digests large numbers of different actor identifiers that might otherwise not match up to each other. Precorrelation normalizes data to address a large number of event types to a finite number of types with the same fields to link back with original data. Actors are linked to events and events are linked to actors bi-directionally, accurately, completely and instantaneously to get out in front of newly arriving data for a rapid response. Precorrelation allows all analyses to drive from and quickly access identical normalized, pre-linked data for drilling down to raw data if necessary.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 depicts a block diagram of a precorrelation core that associates events to actors; and FIG. 2 depicts a block diagram of the precorrelation core with event, context, masquerade and merge modules.

DETAILED DESCRIPTION

Figure 3:
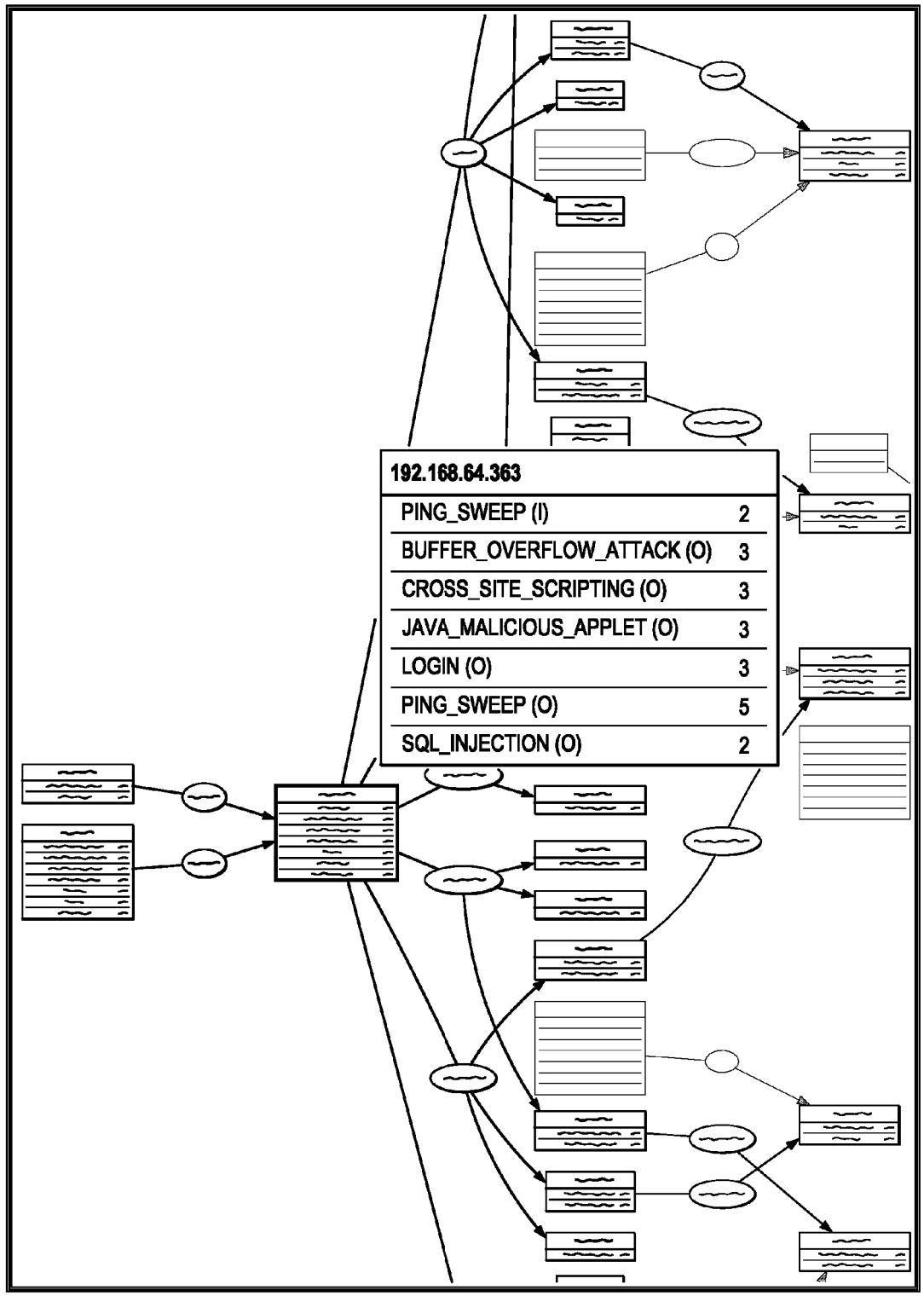
FIG. 3 depicts an example of a fanout diagram.

Precorrelation of data provides improved analysis that ties actors to events before application of a use case. In the example embodiment described herein, precorrelation of network data from a variety of network sensors is performed to identify threats to network security. In alternative embodiments, alternative types of data may be precorrelated for application to alternative types of use cases. In the example of network security, threat patterns emerge through precorrelation by tying events detected by network sensors to actors associated with the events. Fan out visualizations based upon actors offers a more rapid an accurate depiction of potential threats. In alternative embodiments, actors may be other types of forces that effect events detected by other types of sensors.

In a network security environment, threats often occur in patterns coordinated by factions defined through member interrelationships. Factions are typically relatively cohesive and persistent in the search for political or financial goals over time. In many cases, network attackers modify existing tools to meet new objectives instead of re-writing tools from scratch. Similarly, at attackers repeat attacks over time, particular factions tend to follow known attack sequences to compromise a target using tools and techniques proprietary to the particular faction. Sensors of a network gather information about these attacks over time, however, the large amount of data picked up by sensors tends to be difficult to analyze. For instance, many different event sources may each have their own formats, such as events that are associated with flows, authentications, accesses, security, and policy. Data comes from different context feeds, some of which are constantly updated, such as blacklists, anonymous proxy, bad user-agent, bad URL, geolocation, whois, zone, DNS, LDAP, organization database, policy rules, vulnerability scans and whitelist contexts. Data tends to have identity masquerading that often changes with events, such as DHCP, VPN, NAT, load balancing, proxy and PAT.

To counter network security attacks, data is analyzed with use cases that attempt to identify attack patterns. The use cases grow over time as threats are identified, vary in complexity, and are potentially infinite in number. One example of a use case is a compound signatures use case: a blacklisted host in Country A passes through a load-balancing proxy to attack an internal high-value host vulnerable to attack to have the internal host open a control connection directly to the host in Country A via HTTP using a suspicious URL and user-agent. Another example use case is a recent multi-hop relationships use case: a host in Country A has recently been engaged in compound signatures HTTP connections with other internal systems. Yet another example is a long-term behavioral profiling use case: an internal host has never received a compound signature attack or been sent similar HTTP traffic, and is never active during hours the attack is received, such as weekends.

Referring now to FIG. 1 a block diagram depicts an example embodiment of a network security system 10 that analyzes data 12 with uses cases 14 based upon precorrelation with a precorrelation core 16. Those of skill in the art will recognize that the data, use case and precorrelation core layers will operation as software modules executing on one or more processors and stored in memory. For example, object oriented software techniques are used to perform the layers on distributed hosts that interface with network storage to analyze data gathered at plural sensors and present the data as visualizations, such as graphical user interfaces. The intermediary precorrelation core layer 16 does the heavy lifting in terms of processing, and leans on the real-time correlation power of now. The availability of precorrelated data allows small, lightweight and fast use case modules—also referred to herein as "clicks" or "click modules". The same use case modules run at multiple sites with different data sensors and sources since the input data to the use cases is normalized by the precorrelation core 16. With normalized data inputs, use cases are typically relatively simple signatures or workbooks that are quick to write, duplicate and edit. Identity masquerading and context data are handled generally, allowing for arbitrary layering. Normalized tables are well suited for producing automated visualizations, such as when a use case identifies a potential threat. Normalized events, instantaneous correlated context and unmasked actors allow for long term-profiling.

Referring now to FIG. 2, a block diagram depicts a precorrelation core 16 that precorrelates data for analysis by use cases. Use cases are expressed in terms of collections, sequences and recursions of six different primitives of precorrelation core 16. An event module 18 has two primites: one that is given an event provides information of the entities involved with the event, such as a shell connection where the source is internal and destination is blacklisted; and another that is given an entity provides information about the event, such as single entity sources more than a hundred failed login attempts and then makes a successful login. A context/augmentation module 20 has two primitive: one that is given an entity provides information about the entity, such as an entity is an internal host and also blacklisted; and given an event, provides information about that event, such as an HTTP flow has a bad user-agent and a suspicious URL. A merge actor module 22 merges entities on the basis of arbitrary identifiers, such as a single user name logging in from many IP addresses. A masquerade module 24 provide entity unmasking to match use cases in the presence of arbitrary layered masquerades, such as with anonymous or load balancing network sites.

Precorrelation core 16 has events, masqs and feeds as inputs, and analytics modules 26, which evaluate compound signatures expressed as constraints and criteria applied to core primitives. Unmasked entities are provided to long term profiling 30, which establishes the basis for context feeds. Network sensors decode network telemetry information to normalize the information for use by event core 18. Event core 18 extracts actors from the normalized network telemetry and then uses the actors as an anchor for presenting visualizations of events around actors. In one example embodiment, five event types are used: flows, authentication, accesses, security events (anomalies) and policy events (password changes, etc. . . . ). Alternative embodiments may use additional event types. Precorrelation of events allows storage of data with actor relationships rather than just data source identities. Actor relationships correlate to create a mesh in the stored data that is accessed by use cases so that actor interrelationships are established. Once actor relationships are established, data from multiple sources is applied to use cases that provide a deep visualization look not possible when data is investigated by source.

An example of a compound signature illustrates the application of use cases to data that is precorrelated by a precorrelation core 16. A host sweep has more than ten distinct targets. The same user logs in from different geolocations. Lateral movement or worm propogation. User VPN access from outside local area generating a large volume of email, and external recipient of shell also in communication with other internal systems. Apply these use cases to actors across a mesh of data from multiple sources will identify a threat more readily than attempting to focus in on data sources separately.

Masquerade module 24 finds actor relationships that are not apparent from data before precorrelation. As an example, a blacklisted threat who is identifiable by a user name and IP address captured by one network sensor will use different IP addresses to pierce a VPN observed by another network sensor. The same threat will use yet another IP address to travel through a load balancer, which is captured by yet another network sensor watching over a vulnerable financial server. Each network sensor observes a different view of the same event and no one network sensor captures details that readily identify the attacker and target. For example, the first network sensor sees the real attacker but not the attack details or real target; the second network sensor sees the attack details but not the real attacker or the real target; and the third network sensor sees the attack details and the real target but cannot see the real attacker. The "masks" that an attacker wears can change slowly over time, such as with DHCP addresses that are intermittently re-assigned, or quickly, such as in a load balancer.

Masquerade module 24 removes masks by considering events in light of all relevant context and supporting tracking of real actors with long term profiling. Event module 18 builds event entities from events. Masquerade module 24 uses a similar approach by building shadow entities from masquerade mappings. Shadow entities are typed as either "masked" or "unmasked." Layered masquerades may have layers of masked and unmasked entities. A core entity table that lists known entities is augmented with masquerade information by masquerade module 24, such as event entities tagged as either masked or unmasked types, with unmasked types have an associated shadow entity. Both the core entity table and the shadow entity table are identically augmented with context information that is constantly refreshed. Examples of the application of masquerade module 24 to data 12 are presented in the appendix attached hereto.

Modules Core Architecture Overview

Modules

Click modules are small, selfcontained programs that are specialized for performing a particular function on streaming data. Their working scratchpad is comprised of a number of tables stored in memory. Tables also function as a publish-subscribe communications mechanism, as any module can "bind" to a table produced by any other module, and be notified whenever changes to that table occur. Using modules as building blocks we can construct layered arrangements of discrete data processing functions that automatically classify, sort, aggregate and correlate events as they arrive in real time.

Actors

One particularly useful strategy for sorting events is to organize them by actor. In the Click system, we handle essentially arbitrary event types. We assume only that events are actions involving one or more actors. In some sense, actors can be thought of as nouns persons or things while events are the verbs which describe the actions of actors, either individually or upon each another.

Entities

Actors are a useful highlevel concept for understanding the system at a glance, and conceptually the description is entirely accurate. But if we wish to get more rigorous, within the Click engine, the term "actor" is a vague one that does not directly correspond to any specific structure in the system. At the most fundamental level, the Click core deals with "entities". The term "entity", as opposed to "actor", captures the fact that we may talk about a "what" involved in an action as well as a "who". For example, a user may access a database. Inside the Click core, both the user and the database are distinct entities which may be involved in one or more events.

Entities are defined by their attributes. Specifically, entities are defined by the unique collection of their attributes. There is no single attribute that defines an entity, but no two entities have identical collections of attributes. Because the Click system today handles network entities, we define the attributes of interest as IP address, hostname, entity name (typically username or resource name), fully qualified name (a longer, more specific name that often includes network domain information), mac address and entity type. If we'd like to also start handling physical card readers, for example, we might consider adding attributes such as card reader ID and physical location.

Entities are a useful construct for several reasons. First, they provide excellent anchor points for correlation. That is, as events arrive, we can associate each event with one or more entities. Second, being unconstrained in terms of definition, they are flexible enough to capture the richest entity characterization that each data source is capable of providing, no matter how unusual the source. Over time, the core builds up more and more knowledge about entities, recording information for each such as authentication and security events, peers contacted, and roles played in network communications e.g. client or server, attacker or target.

Because different event sources provide different defining information about entities, we use the Click core to define entities as precisely as possible, without making assumptions. For example, we may have a firewall source that provides only IP address as its actor designator, but we may have a web proxy source that provides hostname as well as IP, and SSH logs that provide IP, hostname and username. In the context of that example, consider a desktop machine that makes outbound web requests as well as outbound SSH connections. It is a pure client. As its connections traverse the firewall, the firewall logs the activity. Let's see what happens inside the Click core as it processes these three different event types.

Due to the "richness disparity" of the event sources, the core will create three separate entities. That is, three separate anchor points are needed for event correlation. The first will be defined by IP only. The second by IP and hostname, and the third by IP, hostname and username. Specifically, the three entity identifiers will look like the following:

All are tuples of the form: (ip, hostname, username, fqname, mac, type)

Entity 1: (192.168.1.52, none, none, none, none, client) (defined by the firewall)

Entity 2: (192.168.1.52, foo.bar.com, none, none, none, client) (defined by the web proxy)

Entity 3: (192.168.1.52, foo.bar.com, barney, none, none, client) (defined by the ssh logs)

As events arrive, they are associated with the most specific entity possible. For example, if we were to add in an IDS data source that always provides IP address, never provides hostname, and sometimes provides username, then some of the IDS events will be associated with Entity 1, while others will be associated with Entity 3, depending on whether the username was available or not in the event data.

Nodes (Actors)

So then, if we wish to ask the question, what has IP address 192.168.1.52 been up to? We can merge all three of the above entities, on the basis of IP address, into what we call a "node". That is, a "node" is defined as a collection of one or more entities that has been merged on the basis of IP or hostname (where IP is preferred if available). In this example, after the merging, we can draw the conclusion that 192.168.1.52 acts solely as a client, has been associated with the hostname foo.bar.com during web communications, and has been associated with the username barney during ssh communications.

Entities are stored in the entity table. And while entities may seem a bit abstract, their abstract definition is the perfect answer to the ephemeral nature of actors on today's networks. Mobile devices come and go, individual people have scores of different usernames, and a single system can be running several different client applications and several different server applications simultaneously. Addresses can literally be valid for only a few minutes, for example in highly mobile environments where DHCP pools are running dry and administrators are forced to switch to extremely short leases.

However, depending on the type of information available, Click has the capacity to see through this ephemeral nature and track the real actor behind the scenes. For example, if a person uses the same username but many different client IPs, we can simply merge entities on the basis of username, and see all the activity the person has generated using this account. Similarly, if an IP address hosts many different user accounts, and we are trying to determine which user is responsible for rogue activity involving the IP address, we can merge entities first on the basis of IP address to see all the activity for all the different users, and then, having identified the correct user based on timestamp, we can then merge entities on the basis of username to see what else this user has been doing on the network. This ability to slice, merge, re-slice, and re-merge entities on the basis of arbitrary attributes to give different sorts of views is very powerful.

Definition: A node is the name we give to a group of entities that have been merged on the basis of IP, if available, and hostname otherwise.

Fanout Diagrams or RCGs

Fanout is the common name we give to the visualization technically termed a Relationship Context Graph, or RCG. This visualization arises naturally from the fact that we are tracking very precisely how entities relate to each other across time and space. Within a specified time interval, we can draw diagrams that illustrate how nodes communicate with each other—what events they generate, what protocols they use, their respective network roles and patterns of behavior. We will see them acting as clients and servers, sources and destinations, attackers and targets.

By starting with any given node, we can use the RCG to view all the other nodes the starting node has talked to within a given time interval, and all the nodes those nodes have talked to, and all the nodes those nodes have talked to, and so on and so on recursively until we reach the limits of the visualization software. Theoretically, we could go on forever recursing over the entity table. An example fanout diagram is shown in FIG. 3.

Nodes and Links Tables

To support the fanout visualization, the core maintains a pair of tables called the nodes and links tables. These tables are unique in the Click system in that this is the only occasion where two tables are needed to drive the visualization rather than one. The nodes and links tables are derived from the core tables, and maintain a timesliced record of nodes (merged entities) and their interactions, which here are called "links".

Each row in the nodes table is uniquely identified by IP address or hostname (IP address if both attributes are available), while each row in the links table is uniquely identified by source node identifier and event name. The most useful information in the links table consists of pointers to the destination nodes which have been involved in a particular event with a particular source. Thus a "link" can be thought of as expressing the "fanout" of a particular event type from a single source to zero or more destinations (zero in the case of single-node events such as anti-virus detections). When these event types include security events, the links table provides particularly useful information as attacks involving multiple targets are immediately obvious.

Sensors

The information displayed in the core event tables and the fanout diagrams are extracted from the events themselves, which arrive via a number of sensors. Sensors can be thought of as an entirely different type of beast in the Click system, as these programs are distinct from the rest of the Click modules and are distributed on a number of DMUs throughout the network. We will not dwell on sensors here but note only that they function as required in either a push or pull fashion to collect the necessary data. Sensors send their data back to the Click MPU via a proprietary RPC protocol, where the events are displayed in a sensor table which is in turn made available to modules within the Click system.

Decoders

In the context we are discussing, the core architecture, a decoder's primary role is to translate between sensor tables and events that the core can consume. There are two primary types of decoders, which here we will call "simple" and "complex". Simple decoders are brought to bear when each individual event presented in the sensor data corresponds to an event we wish to send to the core, and each event provides sufficient information about the actors involved. In that case, the decoder simply translates between the columns of the sensor table and the values that the core is expecting to arrive in event notifications. On the other hand, complex decoders come into play when the sensor data requires that multiple events be stitched together in order to extract sufficient information for a core event notification.

Anomaly Detection

Anomaly events are especially useful in Click, because even when there are a lot of them, we can associate them with individual entities. We may then consider the aggregate collections and sequences of anomalies for entities, nodes, and groups of nodes, which is not overwhelming When IPS or IDS events are available, these events are treated as anomalies and correlated to entities. Thus, an IPS or IDS immediately provides a valuable source of information for Click, especially when combined with a flow event and/or authentication event source that allows us to visualize the normal network traffic in tandem with the anomalies. Normal traffic, when viewed in the RCG, makes it immediately obvious what a particular system's network "role" is. Anomalous traffic makes it immediately obvious which systems are misbehaving.

In addition to anomaly events provided by IPS and IDS systems, Click is capable of detecting anomalies in the event data it processes. It is also capable of detecting meta-anomalies, determined by considering collections of events that have been accumulated by a particular node or entity. Simple single-source-type anomaly detectors are sometimes included in decoders, because decoders are well-positioned to make the detection as they process sensor data. Other anomaly detectors operate as entirely separate modules; this happens when the detector's processing is complex or requires input from more than one information source. In the most general sense, any module in the Click system can function as an anomaly detector simply by sending security event notifications to the core.

Elemental Events: Flows, Authentications, Accesses, Security Events, and Policy Events In the Click system, we assert that all events collected by sensors and presented by decoders can be expressed as one (or possibly more than one) of the following "elemental" event types: Flows, Authentications, Accesses, Security Events and Policy Events.

Flows simply express the fact that one entity communicated with another entity. Authentications occur when one entity authenticates with another. Accesses describe when a "who"-type entity accesses a "what"-type entity, which can be useful for tracking accesses to resources which may span multiple servers, or are of particularly high value. Security events are simply another name for anomalies, so any detected anomaly events are written to the core's security event table. And finally, Policy events record when a entity takes a normal action that is worthy of record according to policy, for example when a user changes their password.

To summarize, normal network traffic collapses to flows, authentications and accesses, while anomalous network events are recorded as security events. Policy events describe normal entity activity and are recorded according to a predefined policy.

Augmentation Context

In addition to extracting information from events on the fly, Click can extract information from non-event sources. Non-event information is typically used to augment the entity table with context information about the individual entities. Augmentation Clicks are currently available to provide DNS, LDAP, whois, geolocation and blacklist information for entities. Typically, DNS and LDAP information is collected from the customer organization, geolocation information is down-loaded as part of the module package, and whois and blacklist information, constantly updated, is streamed from the cloud.

Masquerading

One related type of augmentation information is the masquerade mappings utilized in NAT, DHCP, VPN, or proxy addressing. Click is capable of tracking masquerading so that statistical data can be gathered over the long term for the "real" entity, provided some sort of trackable entity persists over time and the mapping data is available. The basis of this tracking is the realization that entities are in fact equivalent over particular time intervals. One entity simply "masquerades" as another for brief periods.

Historical Profiling and Deviations from Normal

Because Click is organizing events by entity, collecting augmentation data, and observing how entities relate to each other over time, it is only natural to summarize this data and store historical summaries. Daily, weekly, and monthly averages of event occurrences are tracked, along with maximum and minimum daily, weekly and monthly values. Even against such a simple backdrop, it is easy to see when a new event is occurring for an entity, or when the frequency of an event deviates far from normal in a short period of time. Sophisticated statistical profiling, data mining and machine learning algorithms are also implemented to maintain high quality activity, relationship and non-event context baselines for entities.

Given such baselines, tracked on the basis of entity identifier, it is possible to recognize "deviations from normal" for any given entity. To give a high-level feel for the approach, we include an excerpt from a recent article which describes how Target looks at many small and insignificant buying transactions for its customers in order to determine which if them has recently fallen pregnant (a condition known to be associated with buying sprees). A person changing state from not-pregnant to pregnant is not so different from a computer system changing state from not-compromised to compromised. And in the same way as Target, we can piece together all the small, seemingly insignificant events and transactions, looking at them in aggregate for each entity, in order to detect a "sea change" in an entity's behavior.

From the article ("Pole" is the name of the researcher):

"And among life events, none are more important than the arrival of a baby. At that moment, new parents' habits are more flexible than at almost any other time in their adult lives. If companies can identify pregnant shoppers, they can earn millions. The only problem is that identifying pregnant customers is harder than it sounds. Target has a baby-shower registry, and Pole started there, observing how shopping habits changed as a woman approached her due date, which women on the registry had willingly disclosed. He ran test after test, analyzing the data, and before long some useful patterns emerged. Lotions, for example. Lots of people buy lotion, but one of Pole's colleagues noticed that women on the baby registry were buying larger quantities of unscented lotion around the beginning of their second trimester. Another analyst noted that sometime in the first 20 weeks, pregnant women loaded up on supplements like calcium, magnesium and zinc. Many shoppers purchase soap and cotton balls, but when someone suddenly starts buying lots of scent-free soap and extra-big bags of cotton balls, in addition to hand sanitizers and washcloths, it signals they could be getting close to their delivery date.

As Pole's computers crawled through the data, he was able to identify about 25 products that, when analyzed together, allowed him to assign each shopper a "pregnancy prediction" score. More important, he could also estimate her due date to within a small window, so Target could send coupons timed to very specific stages of her pregnancy.

One Target employee I spoke to provided a hypothetical example. Take a fictional Target shopper Jenny Ward, who is 23, lives in Atlanta and in March bought cocoa-butter lotion, a purse large enough to double as a diaper bag, zinc and magnesium supplements and a bright blue rug. There's, say, an 87 percent chance that she's pregnant and that her delivery date is sometime in late August. What's more, because of the data attached to her Guest ID number, Target knows how to trigger Jenny's habits. They know that if she receives a coupon via e-mail, it will most likely cue her to buy online. They know that if she receives an ad in the mail on Friday, she frequently uses it on a weekend trip to the store. And they know that If they reward her with a printed receipt that entitles her to a free cup of Starbucks coffee, she'll use it when she comes back again."

In a similar fashion to determining the stage of a customer's pregnancy, by tracking seemingly minor anomalies for entities, we can identify systems who appear to be treading the path to compromise. Further, based upon how the events unfold over time, we may estimate which stage of the "kill chain" applies.

Signature Language

In order to harness the power of having collected all of this event and context information and organized and tracked it on the basis of entitiy, Click exposes a signature language that is capable of expressing complex decision-making logic in a condensed fashion. As each event streams into the system, the signature engine gains access to not only each event, but also, through the magic of correlation, to the entities involved in each event, along with each of their event, augmentation and relationship histories.

Signatures can be written to concisely express requirements on collections and sequences of events, how the events are distributed through time, and on the history, status and proximity of the involved entities. They can also be applied to act as false positive suppression rules, which take priority over detection rules, and can be qualified to specify the maximum caching periods that will be tolerated in evaluating the various types of augmentation data that may be included in a signature. For example, a particular signature may allow whois data to be cached for 24 hours, but may require blacklist data to be updated instantaneously on the fly for every signature match, to give an extreme example.

Entity Ranking

Signature matching leads naturally to entity ranking Augmentation, historical and relationship context information can all be used to clarify and assist in the interpretation of correlated sequences of events. As signatures are matched, each match is assigned a severity score which is added to the lifetime "health" value of the involved entities. If an entity's health value grows too high, or changes too rapidly, the administrator is called to investigate. The RCG visualization then becomes the administrator's primary investigative tool for gaining a comprehensive view of the situation.

Multicore

Expansion of this architecture to multicore is straightforward. Entity data may be distributed across a number of entity tables stored on various processor cores. The merging step brings the data together as needed. A single "merger" module is responsible for gathering the necessary entities and their associated histories from the various storage locations.

Further, individual modules may be distributed across processor cores as they can use tables to communicate. In this capacity, tables facilitate a general publish-subscribe mechanism whereby modules publish events to a table, and all other modules who have bound to that table receive the event notification. Modules needing to communicate bi-directionally simply bind to each other's tables. This table-based inter-module communication mechanism works identically on a single processor or many, on a single machine or many, and supports an arbitrary number of event types and payloads.

Summary

In this paper we have taken a brief tour of the Click modules system architecture. This architecture is arranged in a layered fashion, with sensors being on the front lines of collecting data from the customer organization. Sensors pass off their information to decoders, which parse, decipher, prune, and stitch the sensor data as needed to generate coherent elemental event notifications which are sent to the core. The core today accepts five type of event notifications: flows, authentications, accesses, policy events and security events, aka anomaly events. From these five event types, entities are extracted and used as anchor points for subsequent event correlation.

In order to consider the actions of a particular node, defined by IP address or hostname, all entities associated with that IP address or hostname are merged together. The result of this consolidation is presented in timesliced fashion in the nodes table. Further, events arising from timesliced node interactions are displayed in the links table in such a manner that the fanout from a single source to multiple destinations is immediately obvious.

Anomaly events are aggregated, correlated, and considered in context, allowing entities to be ranked, so that misbehaving entities (and their corresponding nodes) are readily identified. Relationship Context Graphs, also known as fanout diagrams, allow for the interactive exploration of network relationships and how these relationships evolve over time. By using the ranking mechanism to guide the analyst's attention to misbehaving nodes, and then using the fanout diagrams to gain further contextual awareness, it is possible to rapidly identify problematic areas of the network.

In a novel and intuitive fashion, the Click system allows the analyst to exploit the full breadth and depth of contextual information provided by arriving events as well as by non-event sources.

The Click system includes several workbooks that quickly draw the analyst's attention to regions of interest in the data set. Arriving events are automatically organized according to actor. Actors are automatically augmented with context information, such as geolocation, zone and blacklist status. Analysis modules utilize the pre-correlated, pre-augmented data to discover anomalous event sequences and actor relationships.

Figure 4:
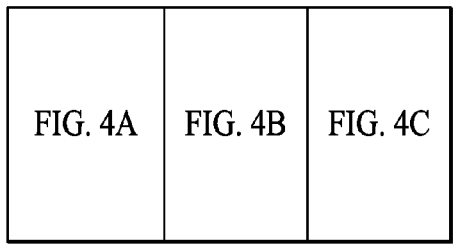
FIGS. 4A, 4B, and 4C depict an example of a fanout diagram showing the exploration tool.

Click workbooks provide the user interface into this pre-correlated, pre-augmented, pre-analyzed mesh of actor events, attributes and inter-relationships. Workbooks expose regions of the mesh by slicing it along various axes and then using layered filtering to highlight the regions most likely to contain suspicious or anomalous activity. Finally, the fanout charts provide an elegant and powerful fine-grained exploration tool that reveals the "story" behind each detection, such as fanout chart depicted in FIG. 4.

Each Click workbook may be thought of as presenting a particular "slice" of the data mesh, while the mesh may be thought of as an endless multi-dimensional woven fabric of events leading to actors leading to events leading to actors leading to events, etc etc. on and on to infinity.

Each workbook focuses on an area of the mesh that is likely to be of particular interest, such as activity surrounding blacklisted actors, actors from foreign countries, and actors generating high-severity events. Within a workbook, the data is filtered and bucketized in such a way as to highlight the most promising regions for analysis.

To make this description more concrete, please consider the image above. As shown in that screenshot, a particular workbook is selected in the left-hand menu. Then, within a workbook, various worksheets are provided as tabs. Finally, each worksheet contains several square panes called "portlets".

In the default workbook set described in this document, each worksheet is organized into exactly three portlets. These portlets present hierarchically-filtered views of the worksheet data. At the top left, the "driving portlet" provides a coarse-grained bucketization. At the bottom left, the "grid portlet" allows the selection of individual actors, or groups of actors, from within buckets. And finally, at the right side of the worksheet, fanout diagrams enable detailed exploration of individual event sequences and actor interrelationships.

As an example, the Blacklist workbook (shown in the above screenshot) allows the analyst to explore the activities of all blacklisted actors from various perspectives. In the data set used to generate the example images in this document, 100 k+ events were reduced to ~12 k actors. Of the 12 k actors, 43 were blacklisted. This is the initial drill down provided by the workbook. The worksheets then highlight particular groupings and rankings of these blacklisted actors based on their attributes. For example, the driving portlet in the worksheet shown above is a bar chart that bucketizes the blacklisted actors according to country of origin. Finally, the fanout charts show at a glance how selected actors relate to one another both in terms of status and communications.

Once a basic level of familiarity is achieved, the analyst can quickly click through the provided workbooks and gain an actionable level of situational awareness.

Against the backdrop of this introduction, let us take a brief tour of the currently available workbooks.

Blacklist

Figure 5:
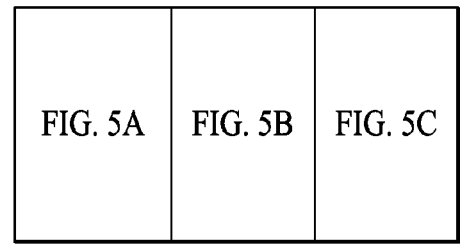
FIGS. 5A, 5B, and 5C depict blacklisted e-mail servers.

The first image given in this document shows the "Country" sheet of the Blacklist workbook. The driving portlet is a bar chart that bucketizes the 43 blacklisted actors according to country of origin. We have interactively selected the actors from Germany, the Bahamas and the United States, causing them to all be graphed together in the fanout portlet on the right. At a glance, we can see that most of the blacklisted actors are email servers that are receiving transmissions from a handful of systems on protected network (the blacklisted email servers are represented by the bank of red nodes on the right-hand side of the diagram, See FIG. 5).

Similarly, the image above shows the "Severity Stats" sheet of the Blacklist workbook. Here the driving portlet is a parallel coordinate graph with the following axes: Continent, Country, Average Severity, Max Severity, Total Severity, and Event Count. Here "Severity" refers to the normalized severity rankings of security events. In this example, we have interactively brushed the "Max Severity" axis to highlight only those blacklisted actors with severity=3 (critical) events.

This filtering works to extract a single actor from amongst the 12 k-strong multitude. Specifically, the filters find the intersection of blacklisted actors and critical security events, and in this data set only one actor meets that criteria. The parallel graph shows, at a glance, the matching actor's continent (Europe), country (Ukraine), average severity (1), max severity (3), total severity (64), and event count (60).

Further, the fanout chart gives the story: The selected blacklisted (red) actor (on the left) sweeps the protected network for targets. The targets of the scan are colored gray which indicates that they are located in the United States. One of the targets is compromised with a critical SQL injection attack involving xp_cmdshell (the two red ovals describe these events). The victim then contacts a second blacklisted system (the red node on the right) and downloads an executable file (the black oval signifies the download). The victim next contacts a system in Europe (node is colored pink) and sets up a stealthy command-and-control channel. Finally, the compromised host contacts a different (pink) system in Europe and performs a large data file upload over an encrypted connection.

Geolocation

The Geolocation workbook slices into the mesh based on actors' geographical location. Default workbooks are provided for each continent but it is expected that users will also enjoy customizing their own worksheets to highlight particular geographical areas of personal or organizational interest. For example, military personnel may be interested in communications involving a particular foreign country; corporate analysts may wish to detect probes from their competitor's places of business.

In the fanout charts, nodes are automatically colored according to blacklist status, zone membership, and geolocation, in that priority order. Specifically, if an actor is blacklisted, it is colored red; if it belongs to a specified zone, it is colored according to the zone definition. If neither zones nor blacklist apply, the node is colored according to geolocation. In this document we only show colors as they are applied to all deployments out-of-the-box. In the default configuration there is only one zone and it is called "internal"; this zone definition functions to apply the color blue to all actor nodes with reserved IP addresses such as 10.x.x.x and 192.168.x.x. Users are encouraged to extend the default configuration to include their own network zones to which they may apply their own colors.

Figure 6:
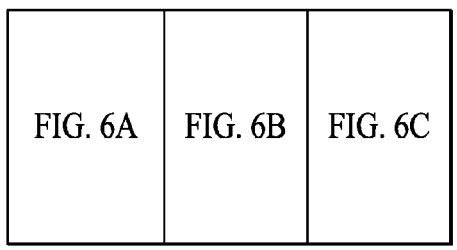
FIGS. 6A, 6B, and 6C depict a geolocation worksheet, showing results for South America.

As an example Geolocation worksheet, as shown in FIG. 6, shows the results for "South America". Notice that all of the nodes in the fanout chart are colored brown which indicates their common location on the American continent.

Using the powerful map tools provided by the Click system, we can drill down on actors from specific countries, regions or cities, and it is possible to view maps and even satellite images of actor locations, including photographs of physical offices.

For example, in the screenshot below, we can see that an actor near Santa Fe, Argentina appears to be operating from within a high-walled compound that has internal treed courtyards. The actor's position in the fanout chart shows that this is an SMTP server; further, that this SMTP server has a single client who is also sending email to three blacklisted systems. (The actor node under consideration is represented by a brown box at the top right of the fanout chart; the selected node is highlighted by an orange border.)

Figure 7:
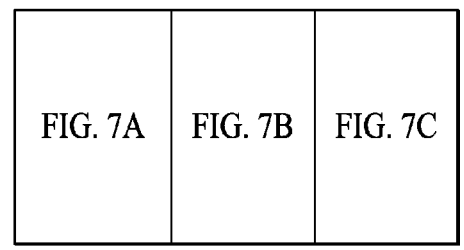
FIGS. 7A, 7B, and 7C depict a fanout chart.

By combining this geolocation capability with other powerful visual analysis tools such as fanout, the Click system bridges the gap between streams of non-descript event logs and the real world of physical locations and tangible actors, as shown in FIG. 7.

Top N Event Statistics

While the previous two workbooks have sliced on the basis of some quality of the actor (specifically, geolocation and blacklist status), this set of workbooks slices according to some quality of an actor's aggregated event stream. Specifically these workbooks consider the "Top N" actors on the network from the perspective of statistics such as overall event count, average event severity, max event severity, total anomaly count, unique anomaly count, etc. A complete list of currently available attributes is given at the end of this section.

To show an example Top N worksheet, a detection from the "Total Critical" Worksheet is given below. Here N, a configurable parameter, is set to 25. Thus this worksheet constantly tracks the top 25 actors in terms of "total critical count". Critical here refers to critical event severity, which is assigned the numerical value 3 (critical=3, high=2, low=1, info=0). Thus, to calculate the "total critical count", one adds 3 for each critical event collected by an actor.

Figure 8:
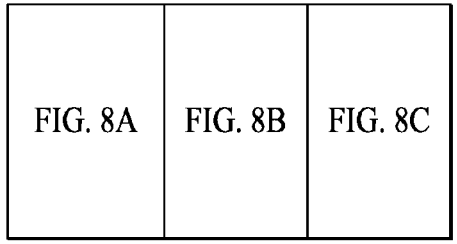
FIGS. 8A, 8B, and 8C depict a bar chart in the driving portlet showing the total critical count per actor for each of the top 25.

FIG. 8 shows the bar chart in the driving portlet showing the total critical count per actor for each of the top 25. We have selected the bar representing the actor with the highest value so that this actor's communications are shown in the fanout chart. As always, the selected actor node is highlighted by an orange border.

The selected actor is an internal system with a reserved IP address (designated by the blue color), and it is attacking an internal (blue) web server with a variety of HTTP-based attacks, including buffer overflows and SQL injection. (Critical-severity attacks are shown by red ovals, high-severity attacks by pink ovals.) It is also sending malicious java to the internal web server shown at the bottom right of the diagram. (Three other systems are also sending malicious java to the same server.). The victim of the HTTP attacks has initiated HTTPS connections with four external systems (the rightmost fan-out pattern); three of these external systems are in the US (colored gray) and one is in Europe (colored pink).

The attacker is also logged in anonymously to an FTP server (the gray box shown to the upper right of the attacker node) and is actively transferring data. The blue (internal) node at the top left is also anonymously logged in to the same FTP server. This blue node is launching a format string attack against the organization's firewall (the red oval at the very top of the image) while engaging in malware-related communications with multiple systems (the large fan-out pattern at the upper right). The gold-colored node is from Asia—the IP is a dynamically assigned address from China's hinet.net, a broadband ISP and well-known haven for hackers and phishing activity.

Figure 9:
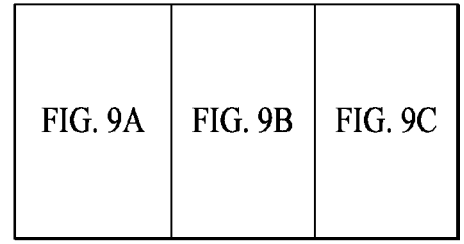
FIGS. 9A, 9B, and 9C depict an example of "Unique Low" workbook.

As a second example of the Top N workbooks, consider the following detection from the "Unique Low" workbook. An actor's "unique low" score is calculated by counting each distinct low-severity event associated with an actor, as shown in FIG. 9. The actor highlighted in FIG. 9 had five unique low anomalies.

The highlighted internal (blue) client system was attacked by a malicious ad server which accomplished the drive-by compromise while the user was browsing the web (the large black oval shows the server-to-client event). The victim then requested an executable file from three (gray) systems in the United States, one of which successfully provided the download (the small black oval) in the form of a UPX packed file. The newly compromised system then successfully logs in to an employee's desktop machine (the leftmost green node). This system in turn launches password guessing attacks against three (blue) systems (moving from left to right in the graph). One of the login attempts eventually succeeds and then there is again lateral movement from this beachhead—first via a Windows login to the rightmost green node, which is the organization's Finance Server, and next via an SSH login to a seemingly random system on the internal (blue) network. This nondescript system is then observed making large outbound data transfers via HTTPS and anonymous FTP.

The full list of currently available Top N statistics is given below.

Event Count

Unique Anomaly Count

Total Anomaly Count
Average Severity
Total Severity
Unique Critical Count
Total Critical Count
Unique High Count
Total High Count
Unique Low Count
Total Low Count
Unique Info Count
Total Info Count
Source Actors In a departure from the previous examples, here we demonstrate a case of Click revealing a normal, rather than a hostile, pattern on the network.

In this workbook, we consider only actors who are event sources (as opposed to event destinations) and then organize these actors according to their maximum event severity. This organization allows us to consider actors in layers: first those having at least one critical event, then those having at least one high event (but no critical), then those having at least one low event (but no critical or high), and finally those with at least one informational security event (but no critical, high, or low). Actors are then further sub-bucketized within worksheets according to country of origin.

Figure 10:
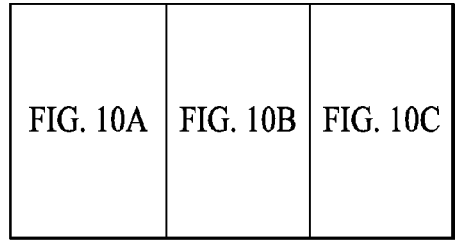
FIGS. 10A, 10B and 10C depict a fanout chart worksheet for the event sources having maximum event severity=informational.
Figure 4A:
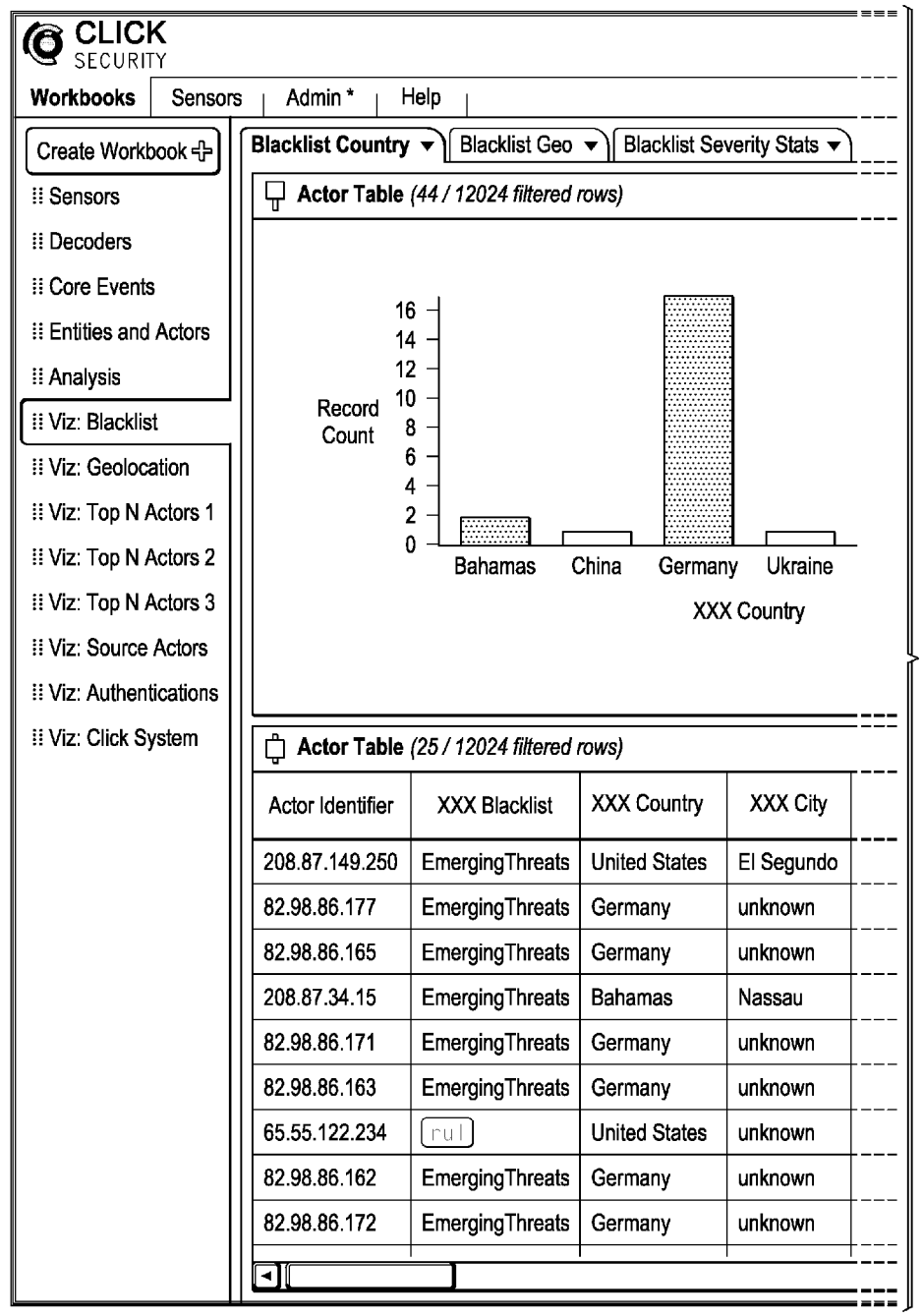
Figure 4B:
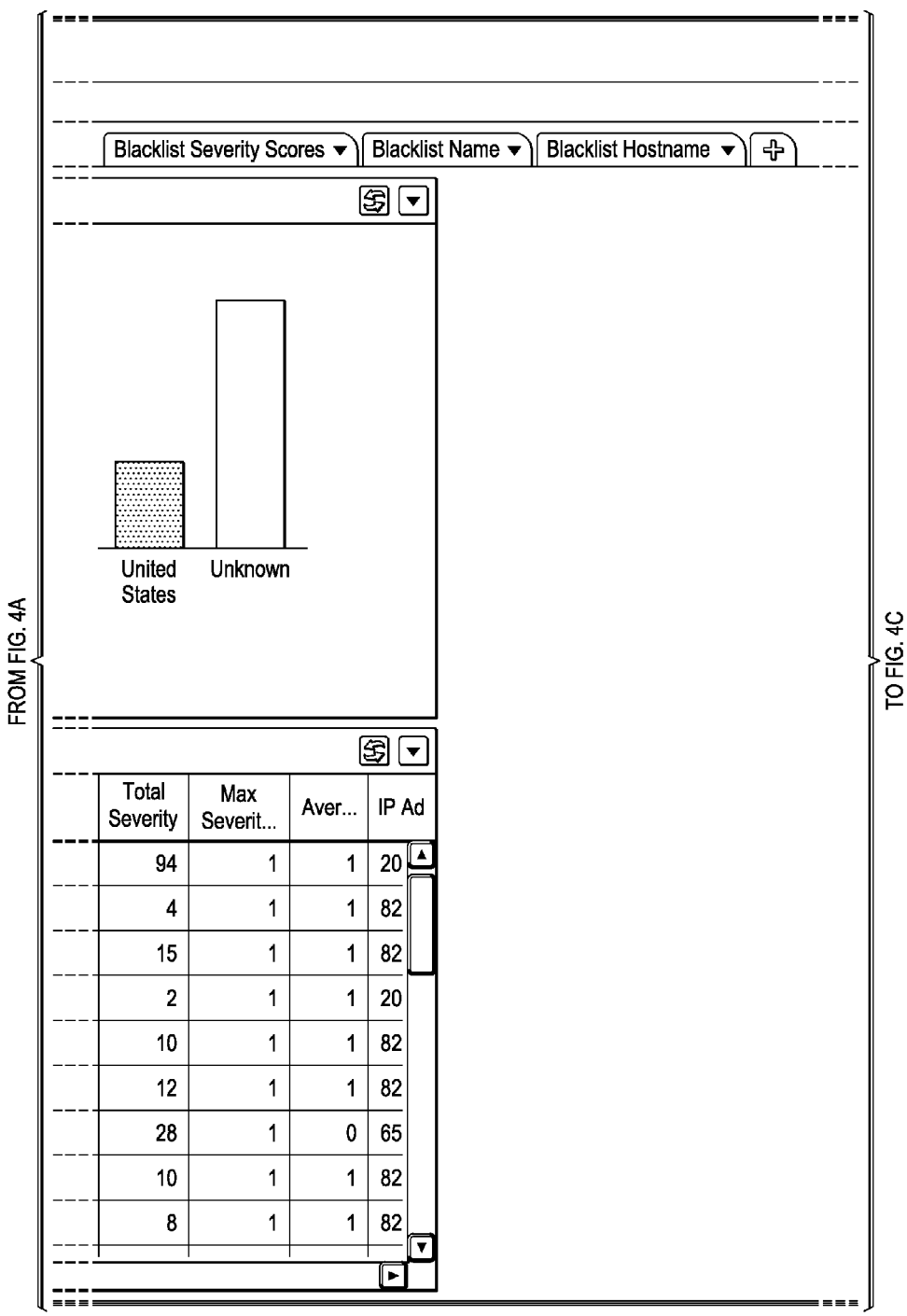
Figure 4C:
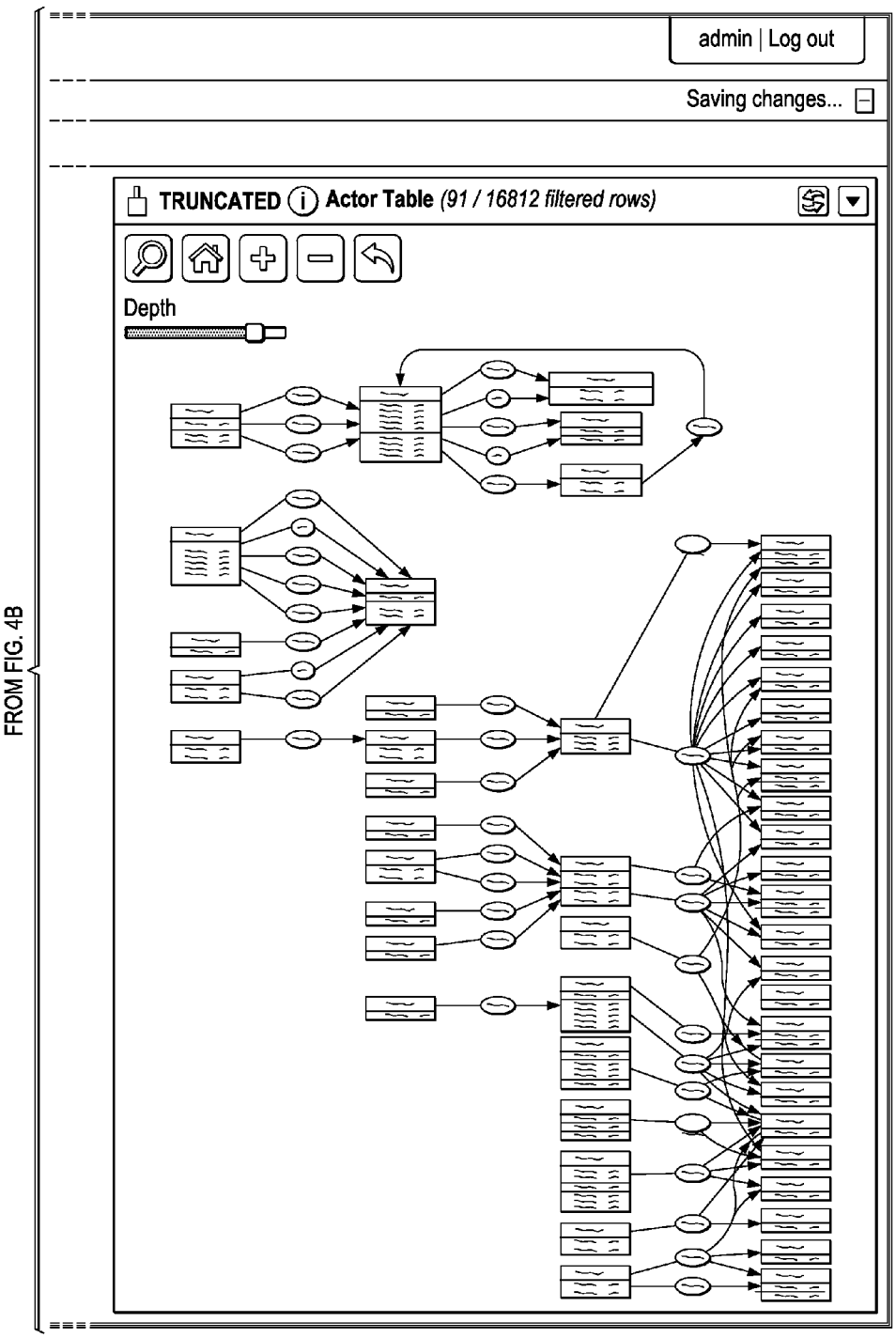
Figure 5A:
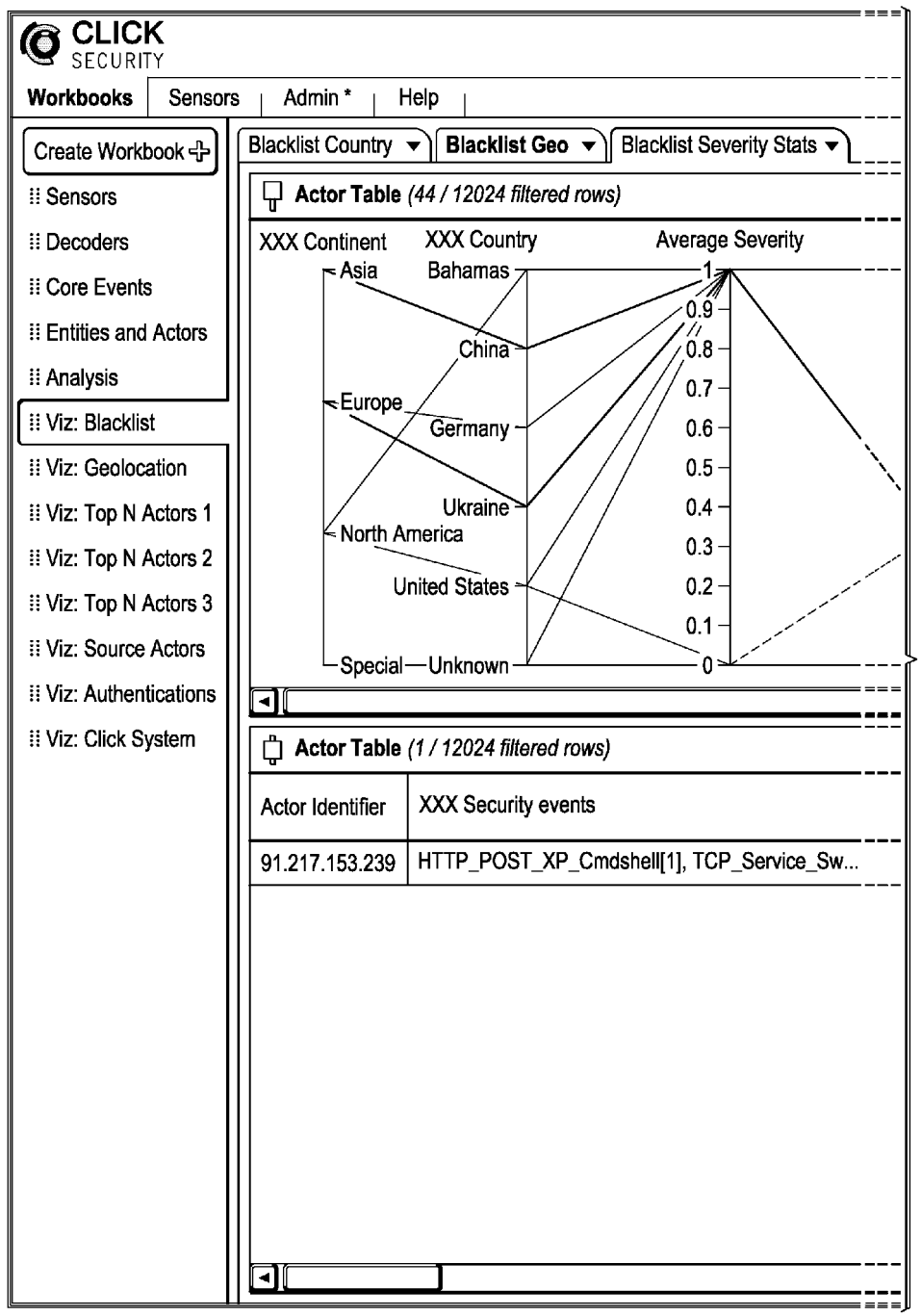
Figure 5B:
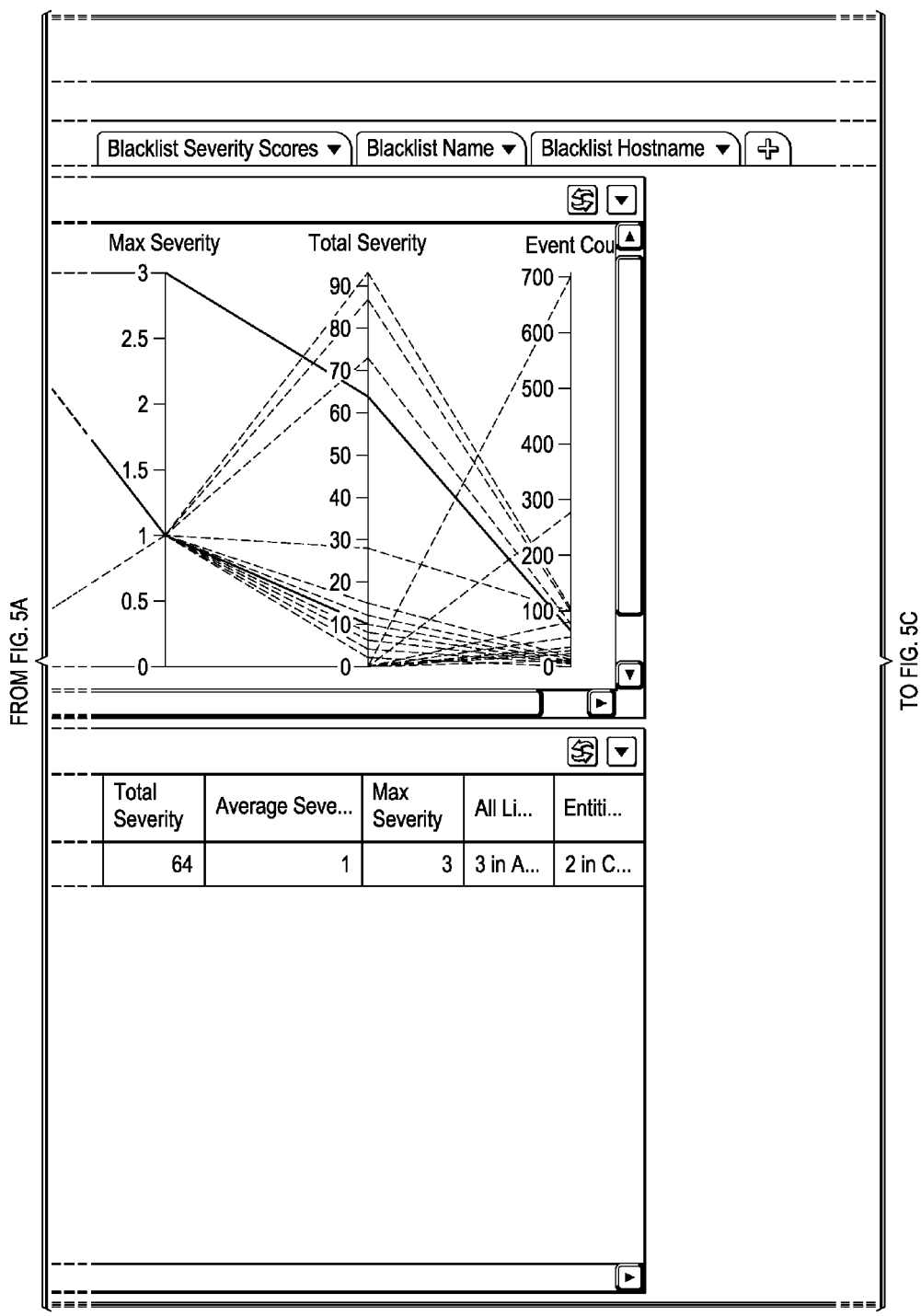
Figure 5C:
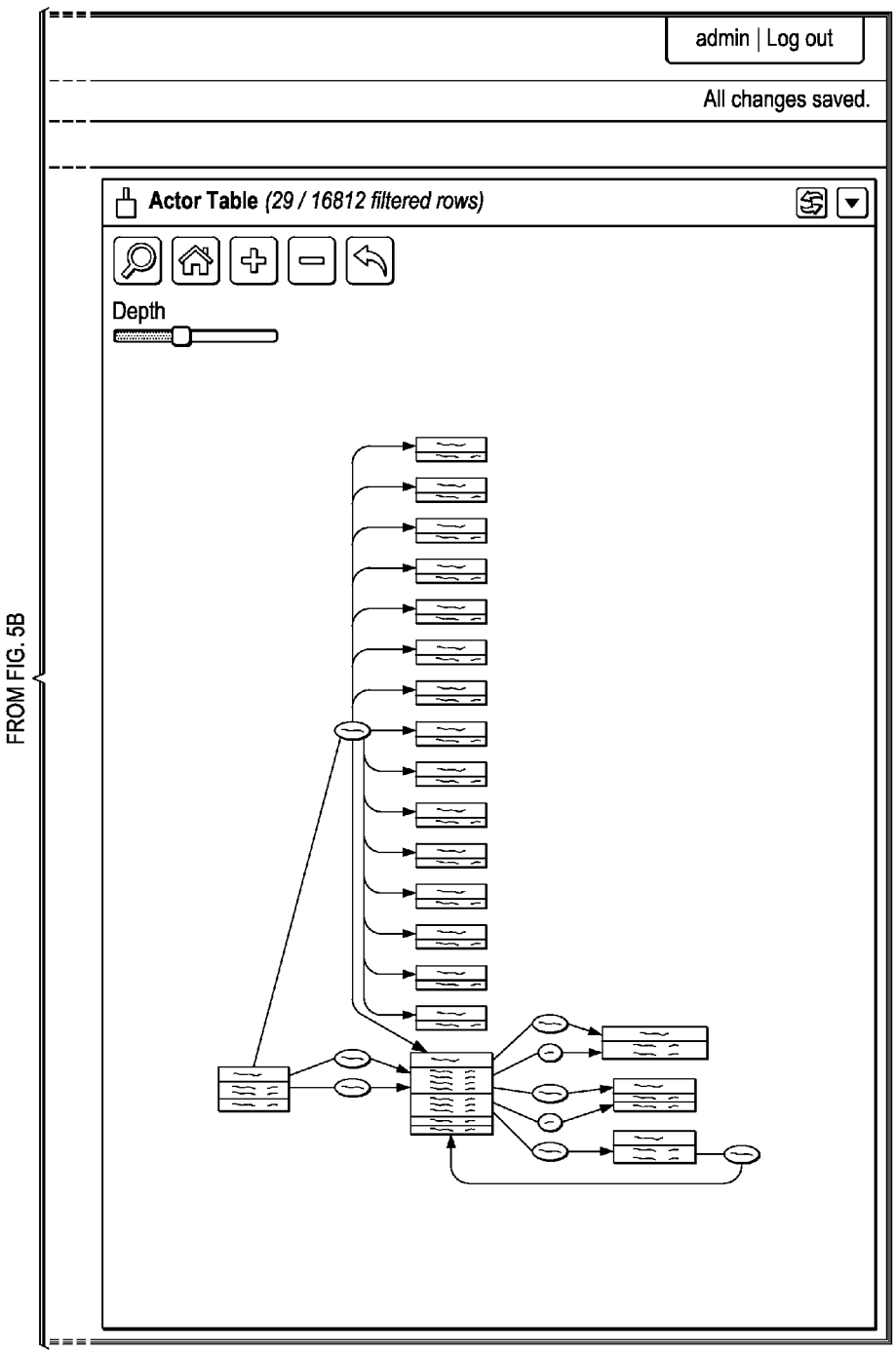
Figure 6A:
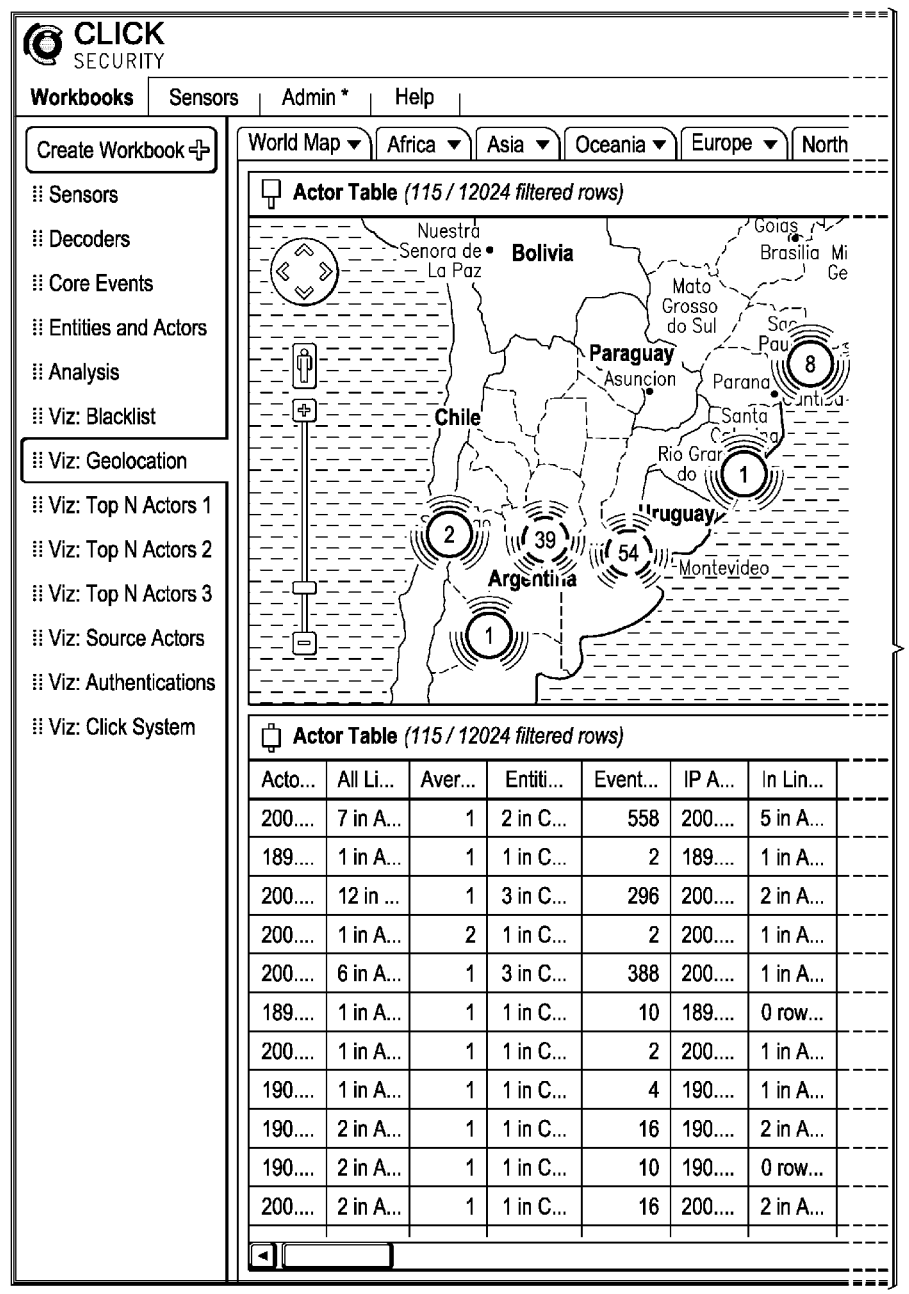
Figure 6B:
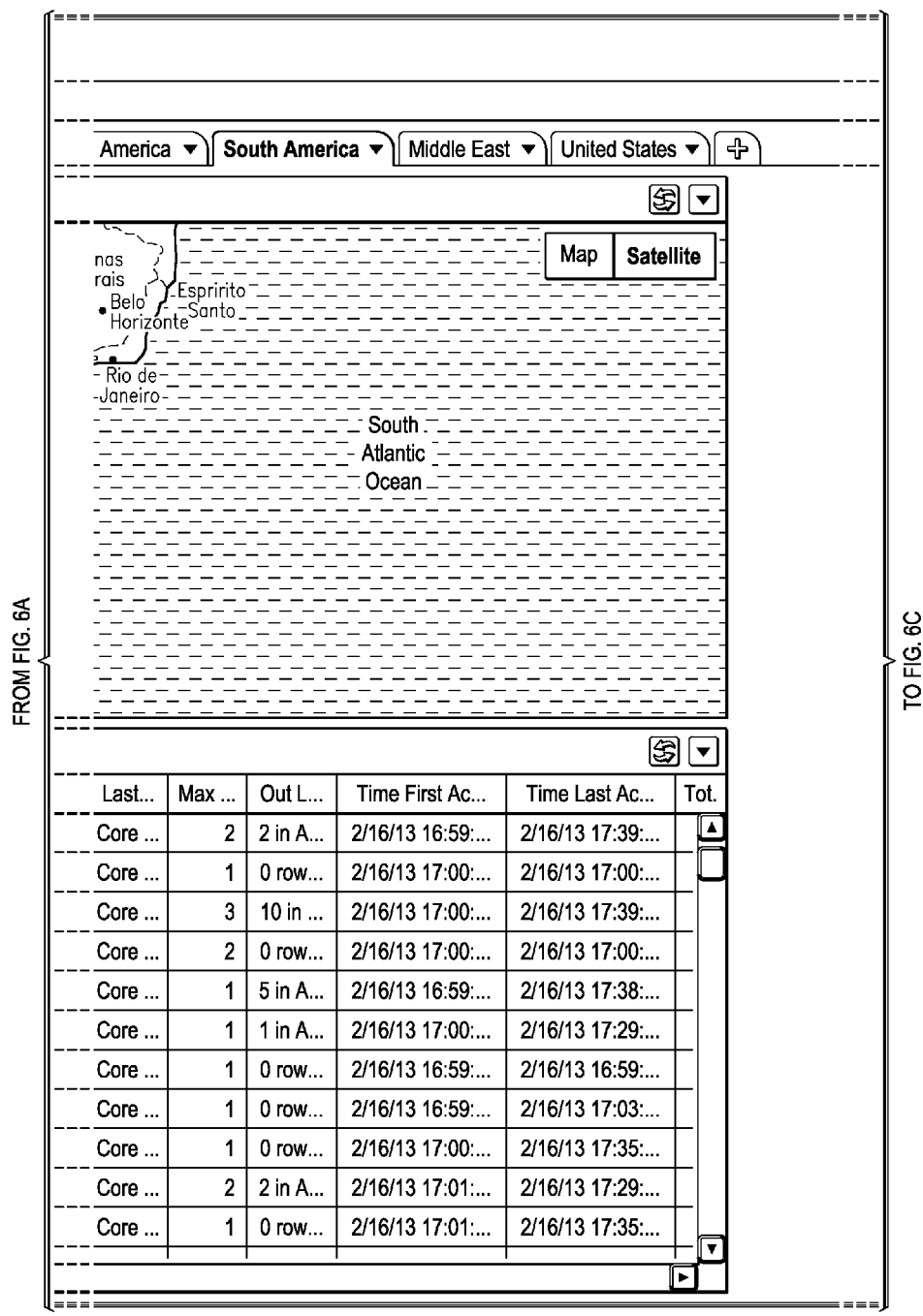
Figure 7A:
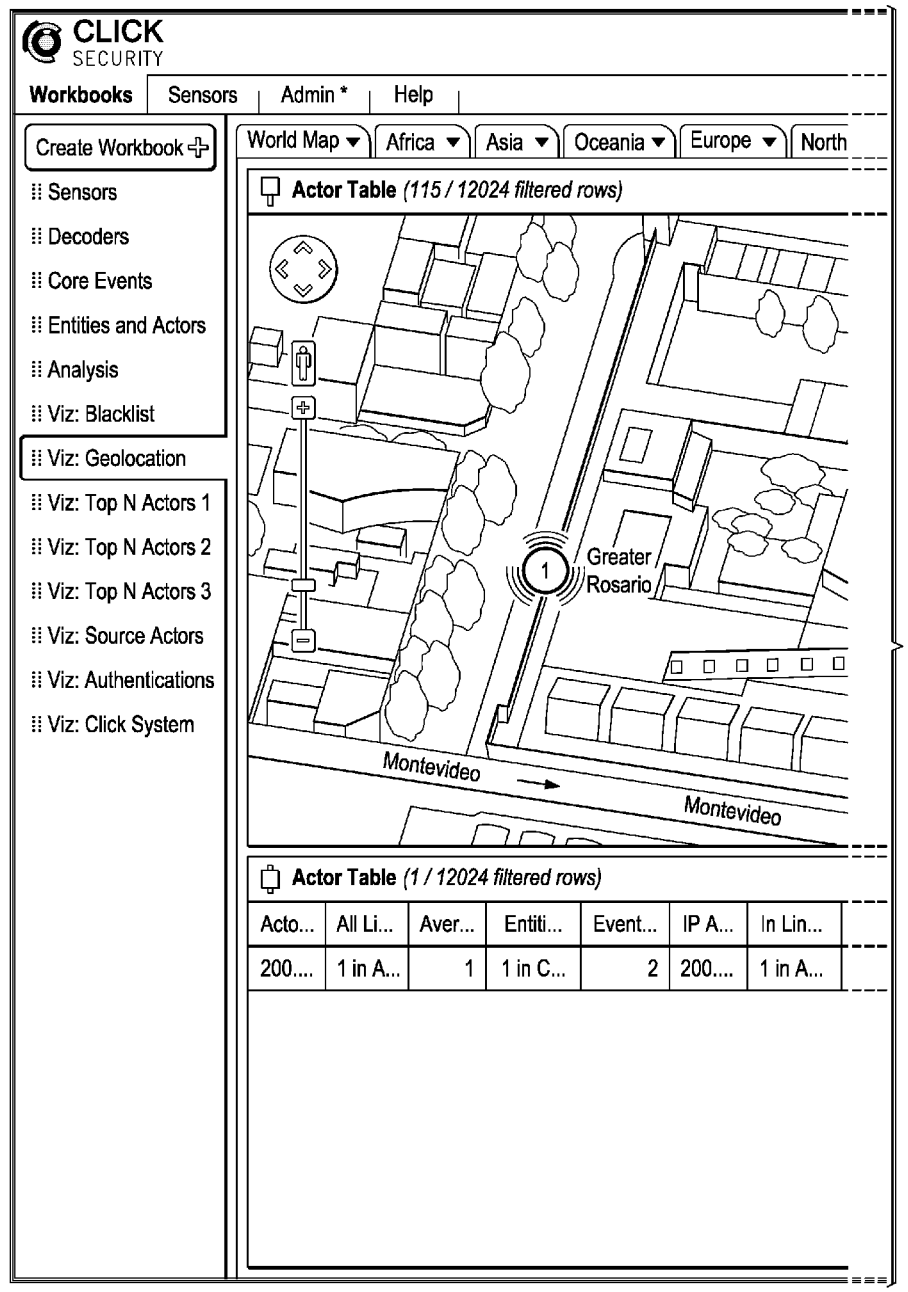
Figure 7B:
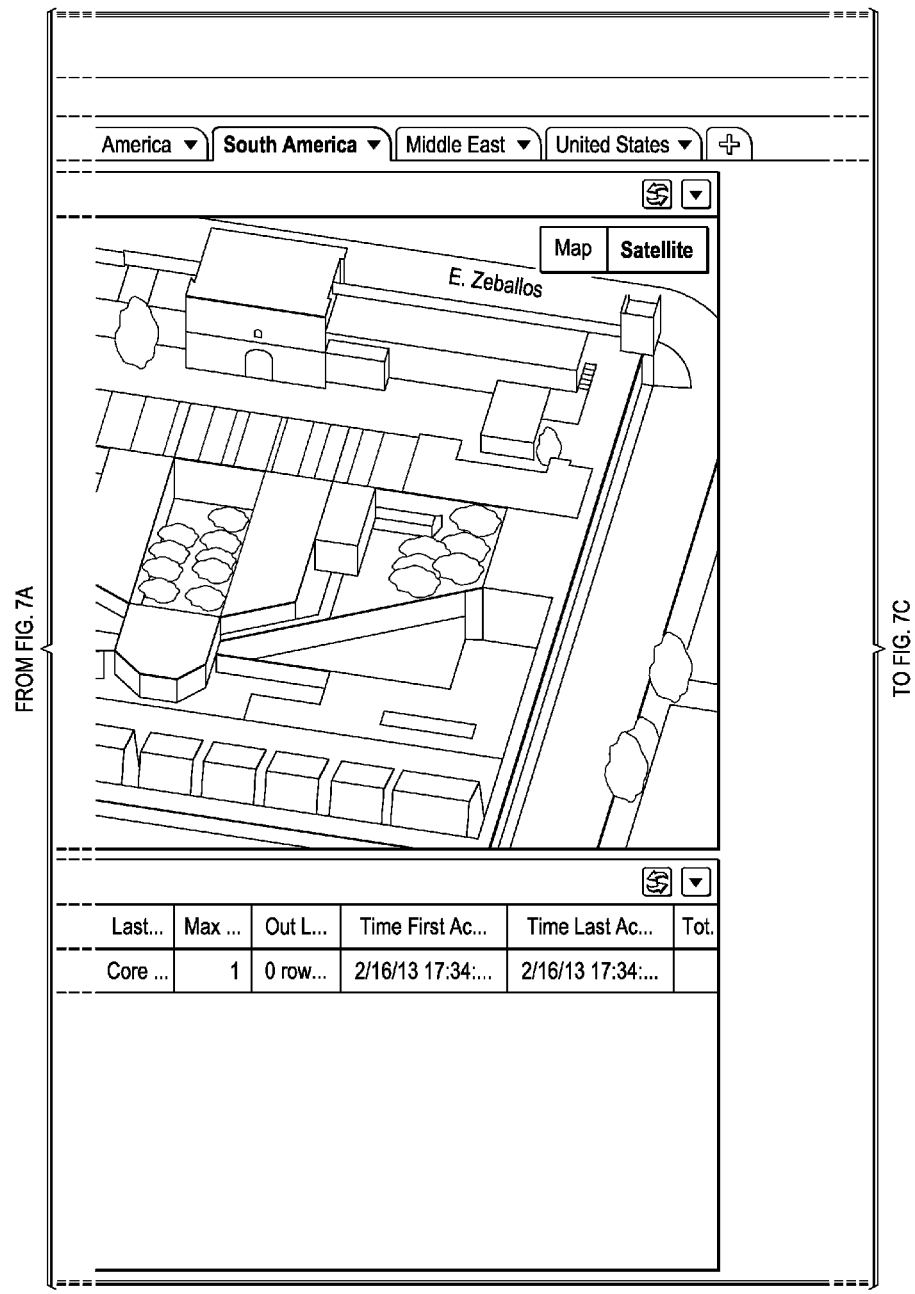
Figure 7C:
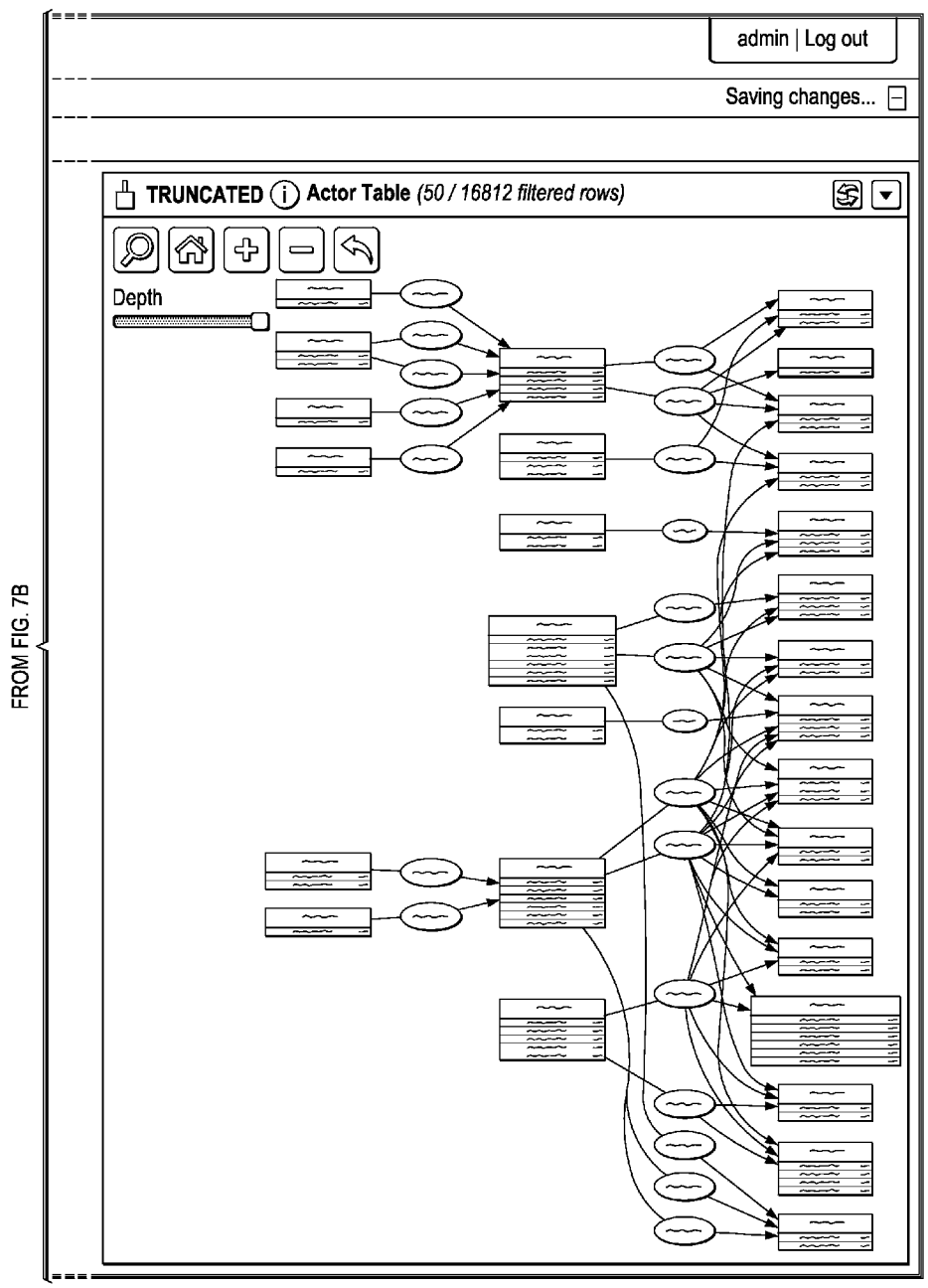
Figure 8A:
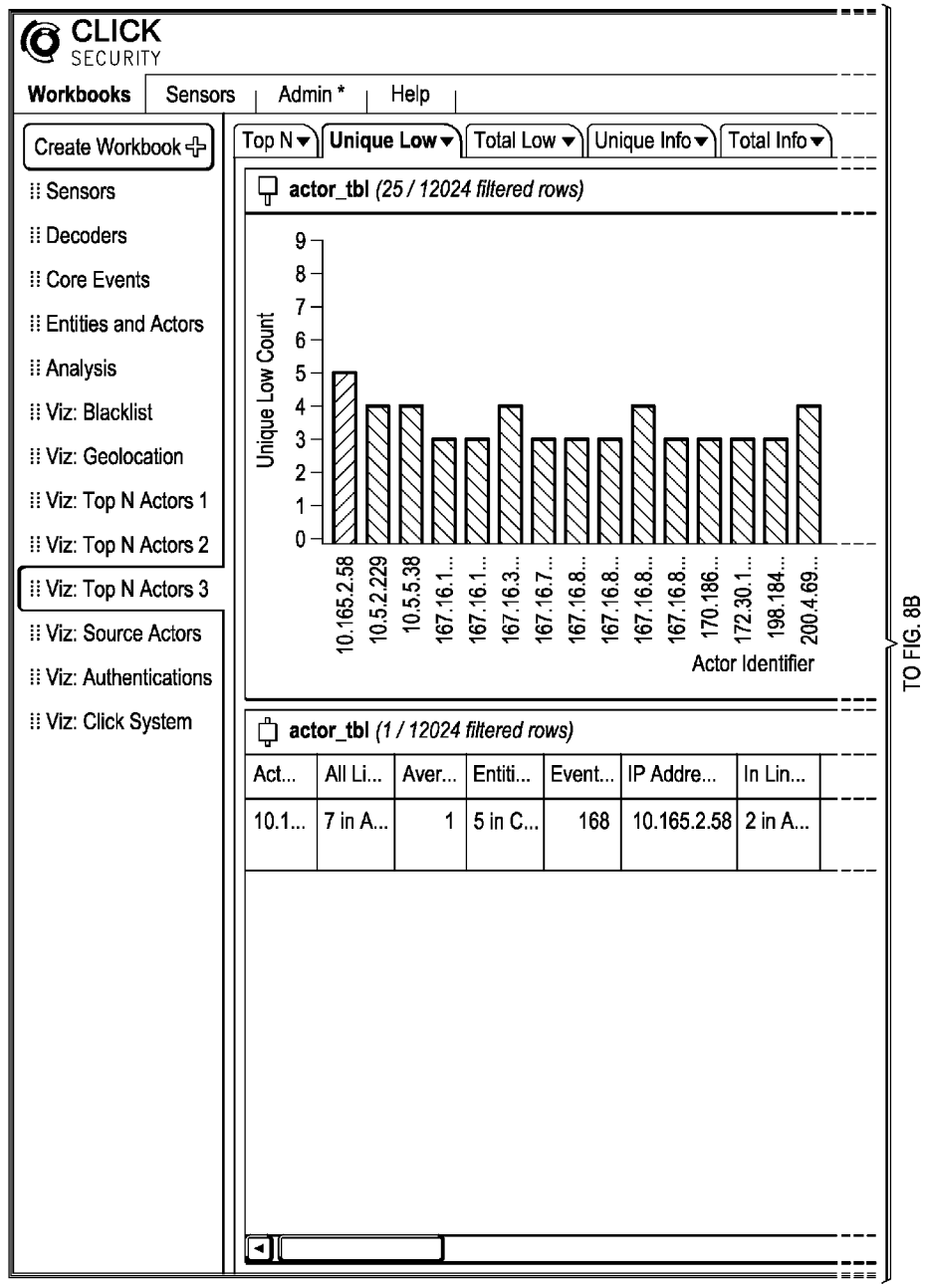
Figure 8B:
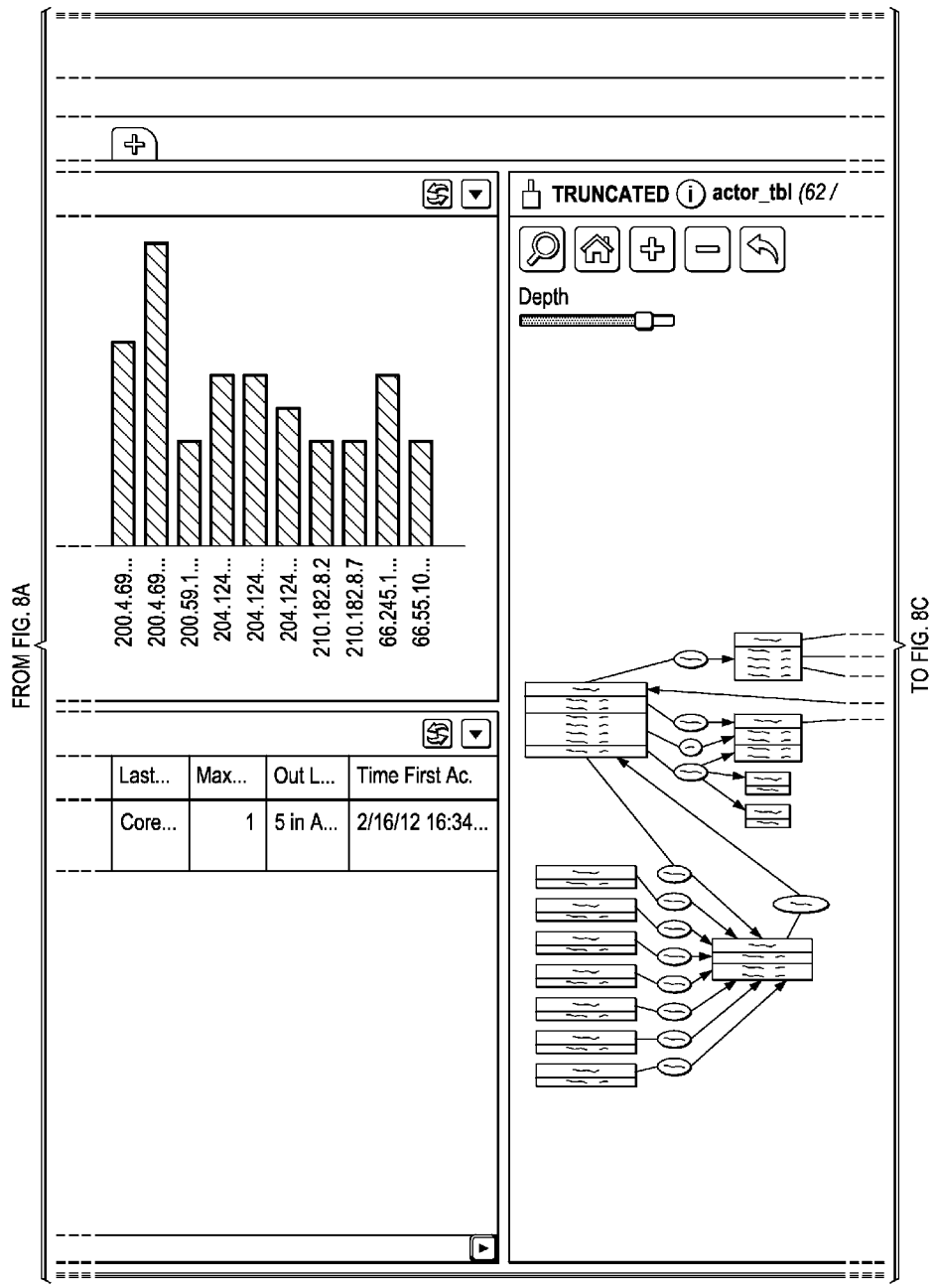
Figure 9A:
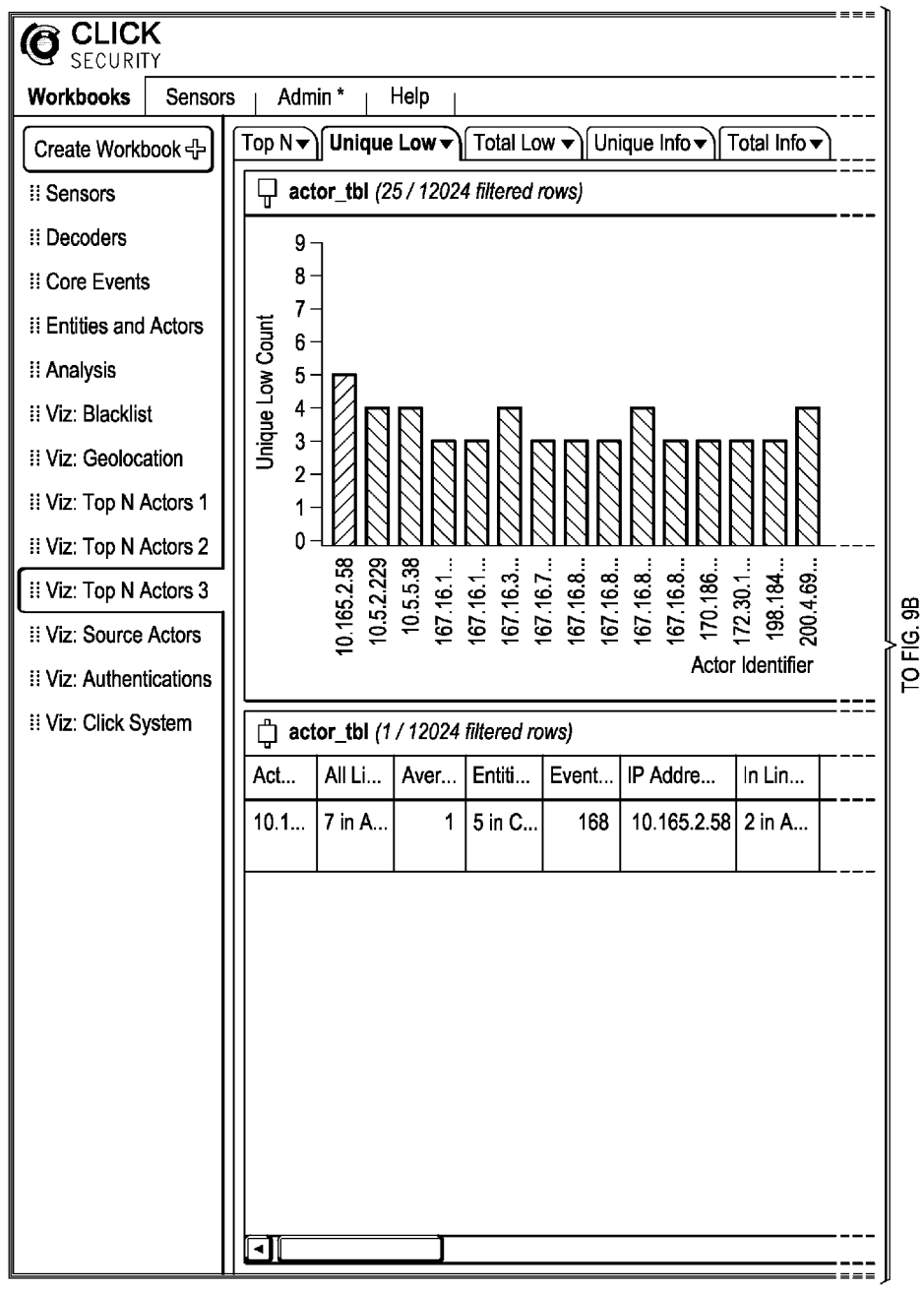
Figure 9B:
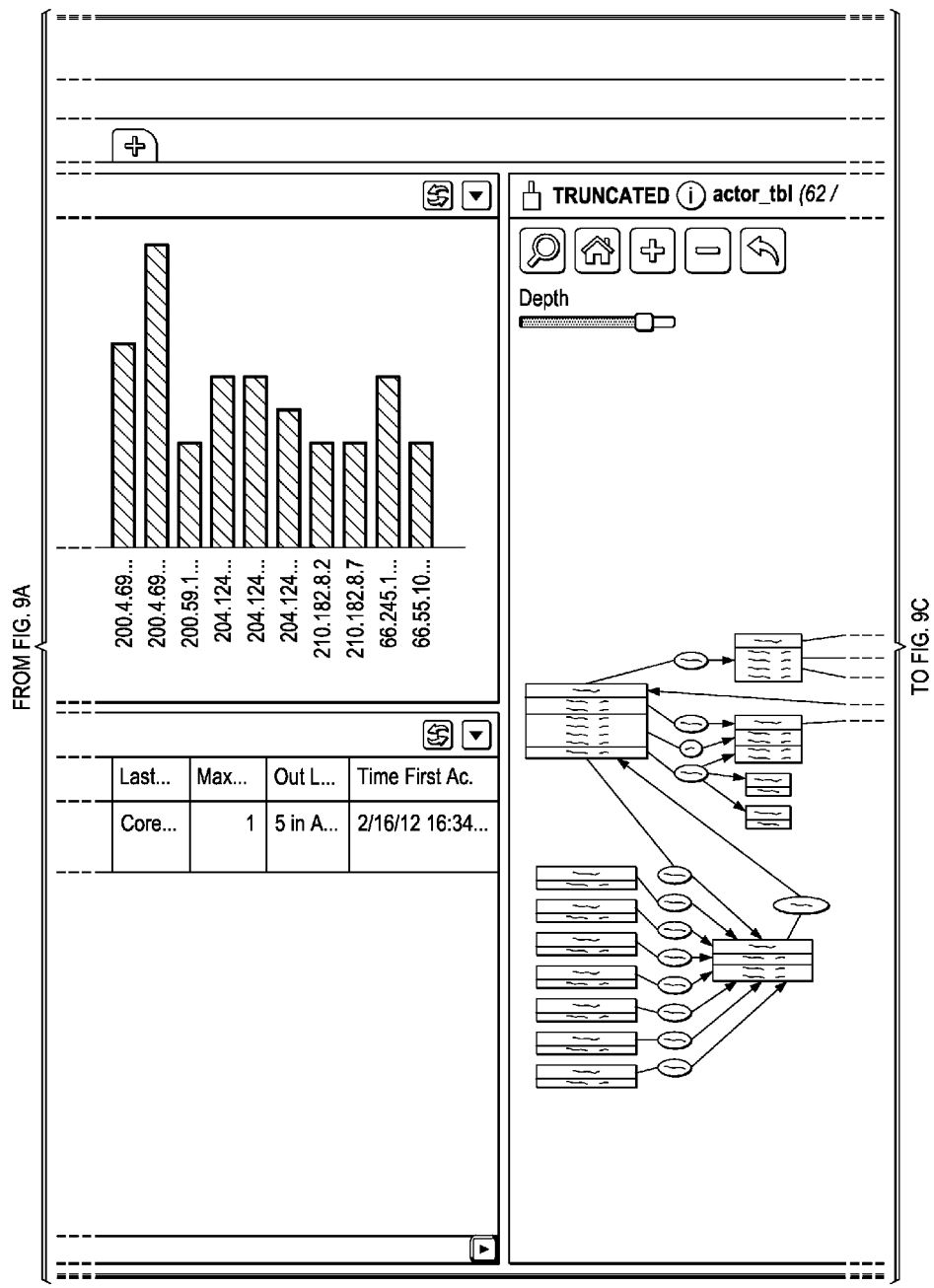
Figure 9C:
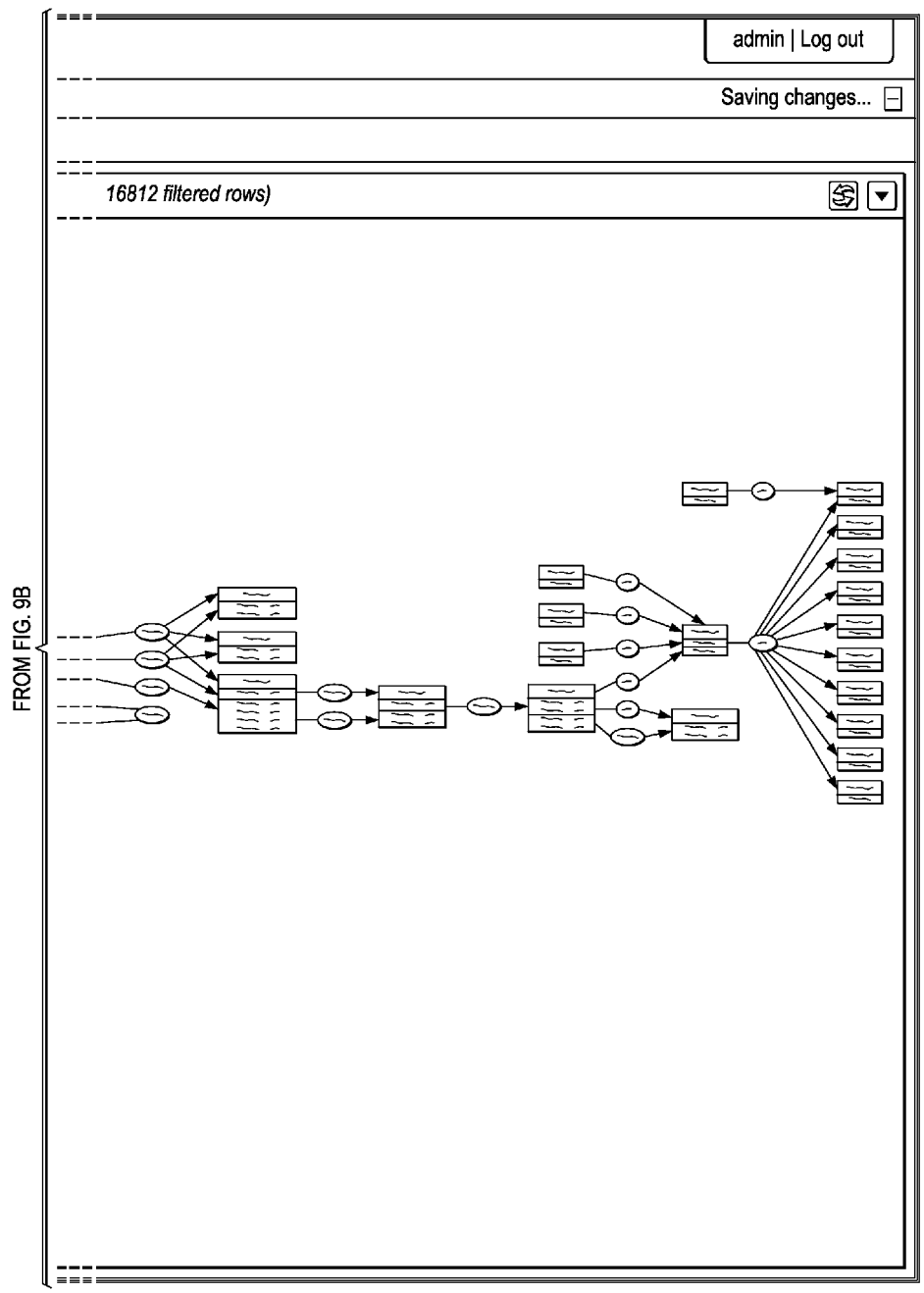
Figure 10A:
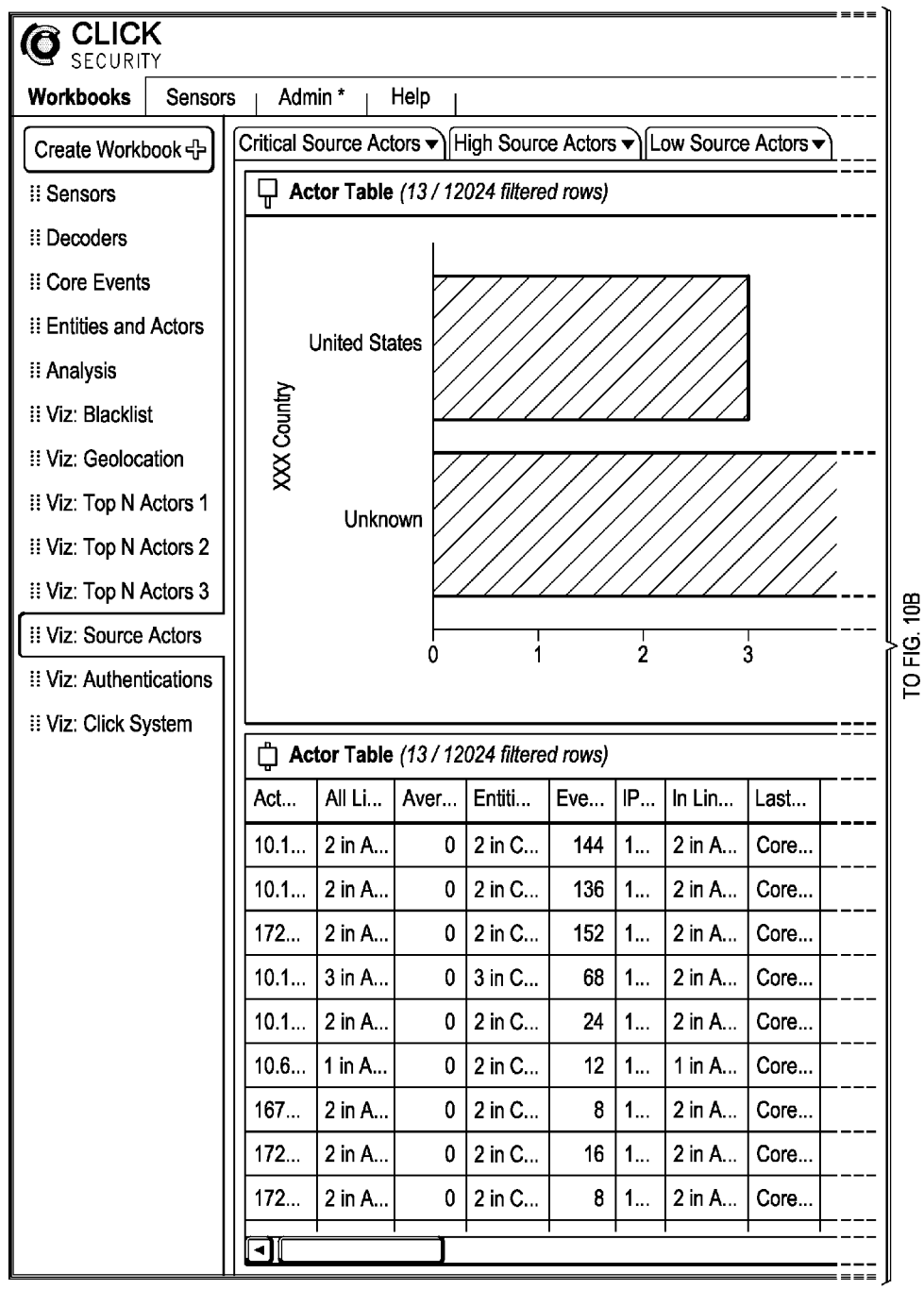
Figure 10B:
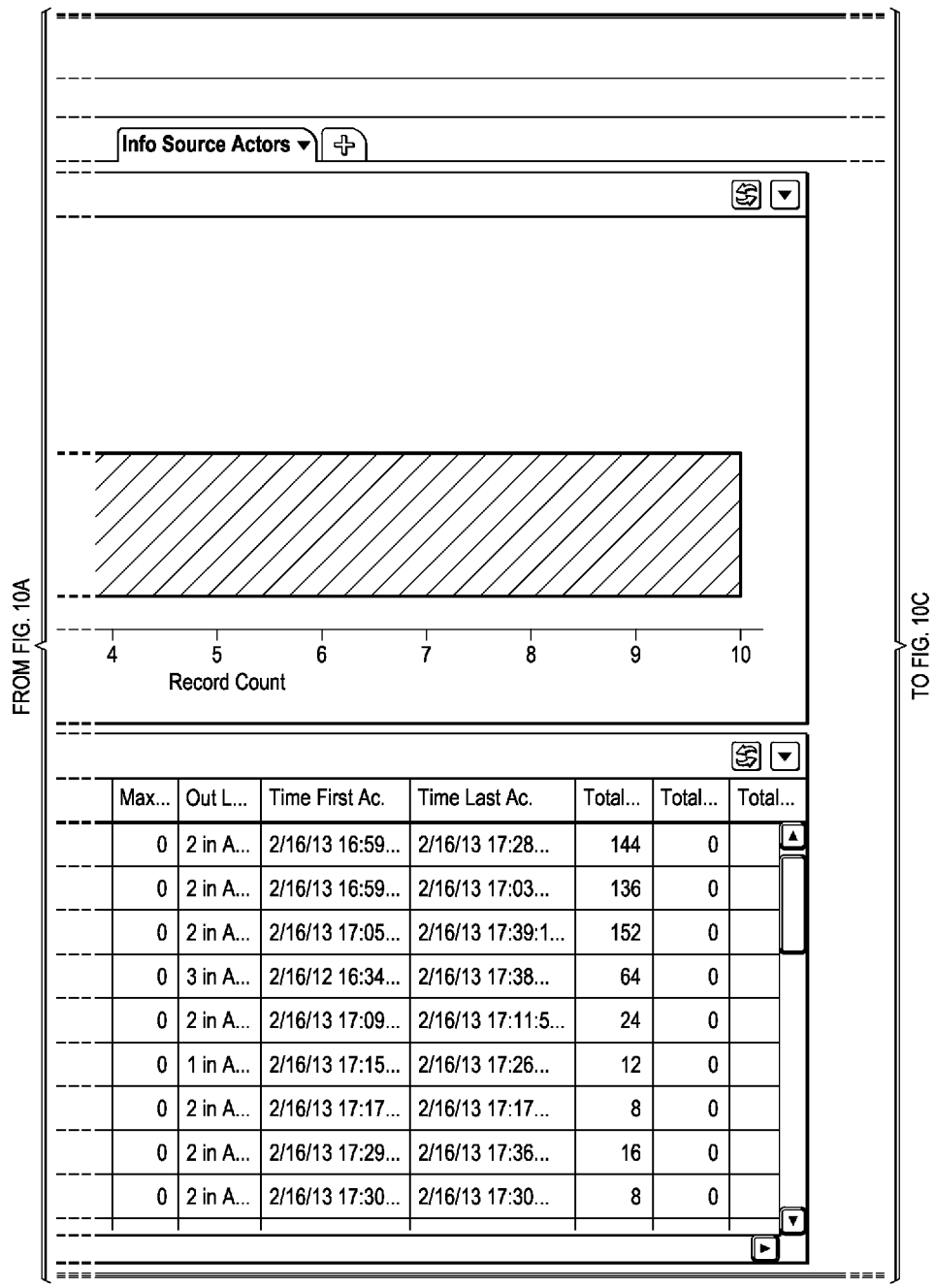

Rather than looking at the actors with high severity events, for this example let's consider the fanout chart for the event sources having maximum event severity=informational. This worksheet yields the image shown in FIG. 10, which gives a somewhat amusing result. Each of the systems meeting the specified criteria is acting identically—these are the security sensors reporting "network inspection suspended" and "network inspection resumed" repeatedly, while designating themselves as both source and destination of the messages. Thus this worksheet reveals at a glance that there are (at least) thirteen such security systems in operation on the protected network. All are operating nearly identically in terms of generating these status messages. Ten of them have reserved IP addresses, while three of them are internet-facing and located in the United States.

SUMMARY

This document has provided an overview of the default set of analyst workbooks. These workbooks and their supporting modules are currently available in an alpha version; the production version will ship with the 1.2 release of the platform.

By providing a series of different views of the actor mesh, these workbooks allow the analyst to enjoy a "grand tour" of the data. Each workbook is designed to highlight different types of anomalous and malicious network actors. By browsing these workbooks, especially those concentrating on actors with critical- and high-severity activity, it is possible for the analyst to quickly identify the actors involved in the most critical attacks, as well as identify the quieter behind-the-scenes players that are often associated with the most damaging aspects of an incident.

While every network is different, it is believed that the analysis methods enabled by these workbooks largely transcend network topology, event rate and attack type. All administrators should be concerned when their users interact with blacklisted hosts, and most are concerned about attacks from one particular region of the world or another. In addition, nearly everyone is concerned when a small group of internal actors begins accumulating a large number of critical severity events. And in every network, actors with extremely high repetitive event counts are likely to be misconfigured, and actors with unusual numbers and combinations of low-severity events may be exhibiting signs of stealthy compromise. And who wouldn't like to organize their networks into zones and browse color-coded diagrams of zone-to-zone communications? This set of default workbooks attempts to codify these simple analyst rules of thumb and make such common sense views readily available.

Although the present invention has been described in detail, it should be understood that various changes, substitutions and alterations can be made hereto without departing from the spirit and scope of the invention as defined by the appended claims.

What is claimed is:

1. A network security system comprising:
   non-transitory memory storing:
   plural use cases operable to identify predetermined conditions in data from plural sources, the predetermined conditions including indications of unauthorized network accesses;
   a streaming data source having network telemetry from plural sensors, at least some of the network telemetry including one or more events and one or more actors, the network telemetry associated with authorized and unauthorized network accesses, the streaming data source storing the network telemetry in one of three entity tables including an IP address entity table, an IP address/hostname table, and an IP address/hostname and user name table;
   a precorrelation core interfaced with the data source and operable to associate events and actors, each event defined as a type selected from the group of flow, authenticate, access, security and policy event types, the precorrelation core associating entities of the entity tables as plural nodes in a node table, each node having a merged group of entities linked to each other with events in a links table to relate entities from different entity tables as the same actor; and
   a fan out graphical user interface depicting events associated by actor.

2. A method for monitoring network security, the method comprising:
   retrieving network telemetry from plural sensors as streaming data, the streaming data having plural events, each event having one or more of IP address, hostname and user name information;
   storing the network telemetry at a data source in at least three entity tables having an IP address table, IP address/hostname table, and IP address/hostname/user name table;
   precorrelating the network sensor information by associating the plural events of the data source with a common actor, the common actor defined from nodes, each node having an entity table entry as an anchor, the anchor merged with entities that share at least one of the IP address, hostname or user name of the anchor; and
   presenting a visualization of the plural events at a display, the visualization depicting a relationship with the common actor, the visualization depicting nodes related by events in a defined time period, the visualization having at least a fan out graphical user interface depicting events associated by the common actor.

3. The method of claim 2 wherein the events are flow, authentication, accesses, policy and security notifications from a network sensor.

* * * * *